(12) United States Patent
Azakami et al.

(10) Patent No.: US 12,344,143 B2
(45) Date of Patent: Jul. 1, 2025

(54) FILLING-BODY MANUFACTURING METHOD, PASSENGER-SEAT-CUSHION-MEMBER MANUFACTURING METHOD, AND FILLING BODY

(71) Applicant: Archem Inc., Tokyo (JP)

(72) Inventors: Nobuyuki Azakami, Tokyo (JP); Taichi Itabashi, Tokyo (JP)

(73) Assignee: Archem Inc., Tokyo (JP)

( * ) Notice: Subject to any disclaimer, the term of this patent is extended or adjusted under 35 U.S.C. 154(b) by 636 days.

(21) Appl. No.: 17/298,023

(22) PCT Filed: Nov. 28, 2019

(86) PCT No.: PCT/JP2019/046667
§ 371 (c)(1),
(2) Date: May 28, 2021

(87) PCT Pub. No.: WO2020/116326
PCT Pub. Date: Jun. 11, 2020

(65) Prior Publication Data
US 2022/0089073 A1 Mar. 24, 2022

(30) Foreign Application Priority Data
Dec. 3, 2018 (JP) .................. 2018-226825

(51) Int. Cl.
*B29C 64/135* (2017.01)
*B60N 2/70* (2006.01)
(Continued)

(52) U.S. Cl.
CPC .......... *B60N 2/7017* (2013.01); *B29C 64/135* (2017.08); *B33Y 10/00* (2014.12); *B33Y 80/00* (2014.12)

(58) Field of Classification Search
CPC ... B60N 2/7017; B29C 64/135; B29C 64/118; B33Y 10/00; B33Y 80/00
See application file for complete search history.

(56) References Cited

U.S. PATENT DOCUMENTS 9,937,838 B2    4/2018   Hiroyuki et al.
10,343,565 B2   7/2019   Baek et al.
(Continued)

FOREIGN PATENT DOCUMENTS

CN    105358013 A    2/2016
CN    106455828 A    2/2017
(Continued)

OTHER PUBLICATIONS

Jun. 8, 2021, International Preliminary Report on Patentability issued in the International Patent Application No. PCT/JP2019/046667.
(Continued)

*Primary Examiner* — Alison L Hindenlang
*Assistant Examiner* — Shibin Liang
(74) *Attorney, Agent, or Firm* — KENJA IP LAW PC

(57) ABSTRACT

A filling-body manufacturing method is a method of manufacturing a filling body 8 that fills a hole part 74 formed at a seat body 7 and at least part of which is bonded to the seat body 7 in a passenger-seat cushion member including the seat body 7 and the filling body, the filling body 8 being a porous structural body 1S made of flexible resin or rubber, the filling-body manufacturing method including a shaping step of shaping the filling body 8 by using a 3D printer.

16 Claims, 28 Drawing Sheets

(51) Int. Cl.
*B33Y 10/00* (2015.01)
*B33Y 80/00* (2015.01)

(56) References Cited

U.S. PATENT DOCUMENTS

| | | | |
|---|---|---|---|
| 2017/0100860 A1 | 4/2017 | Kumagai | |
| 2017/0305093 A1 | 10/2017 | Ziolek | |
| 2018/0043805 A1* | 2/2018 | Baek | B60N 2/7005 |
| 2022/0000216 A1* | 1/2022 | Carlucci | A43B 13/181 |

FOREIGN PATENT DOCUMENTS

| | | | | |
|---|---|---|---|---|
| CN | 107719197 A | | 2/2018 | |
| CN | 207236528 U | | 4/2018 | |
| EP | 18207215 | * | 11/2018 | A43B 13/12 |
| EP | 3892447 A1 | | 10/2021 | |
| EP | 3947032 A1 | | 2/2022 | |
| EP | 3954252 A1 | | 2/2022 | |
| JP | 2009029064 A | | 2/2009 | |
| JP | 2013023140 A | | 2/2013 | |
| JP | 2016044292 A | | 4/2016 | |
| KR | 101522834 B1 | | 5/2015 | |
| WO | 18207215 | * | 11/2018 | A43B 13/12 |

OTHER PUBLICATIONS

Feb. 18, 2020, International Search Report issued in the International Patent Application No. PCT/JP2019/046667.

Jul. 21, 2022, search result of Office Action issued by the China National Intellectual Property Administration in the corresponding Chinese Patent Application No. 201980080103.4.

Aug. 4, 2022, search result of the Extended European Search Report issued by the European Patent Office in the corresponding European Patent Application No. 19892827.7.

* cited by examiner

VIEW IN DIRECTION OF ARROW C

VIEW IN DIRECTION OF ARROW D

VIEW IN DIRECTION OF ARROW B

VIEW IN DIRECTION OF ARROW D

FIG. 18
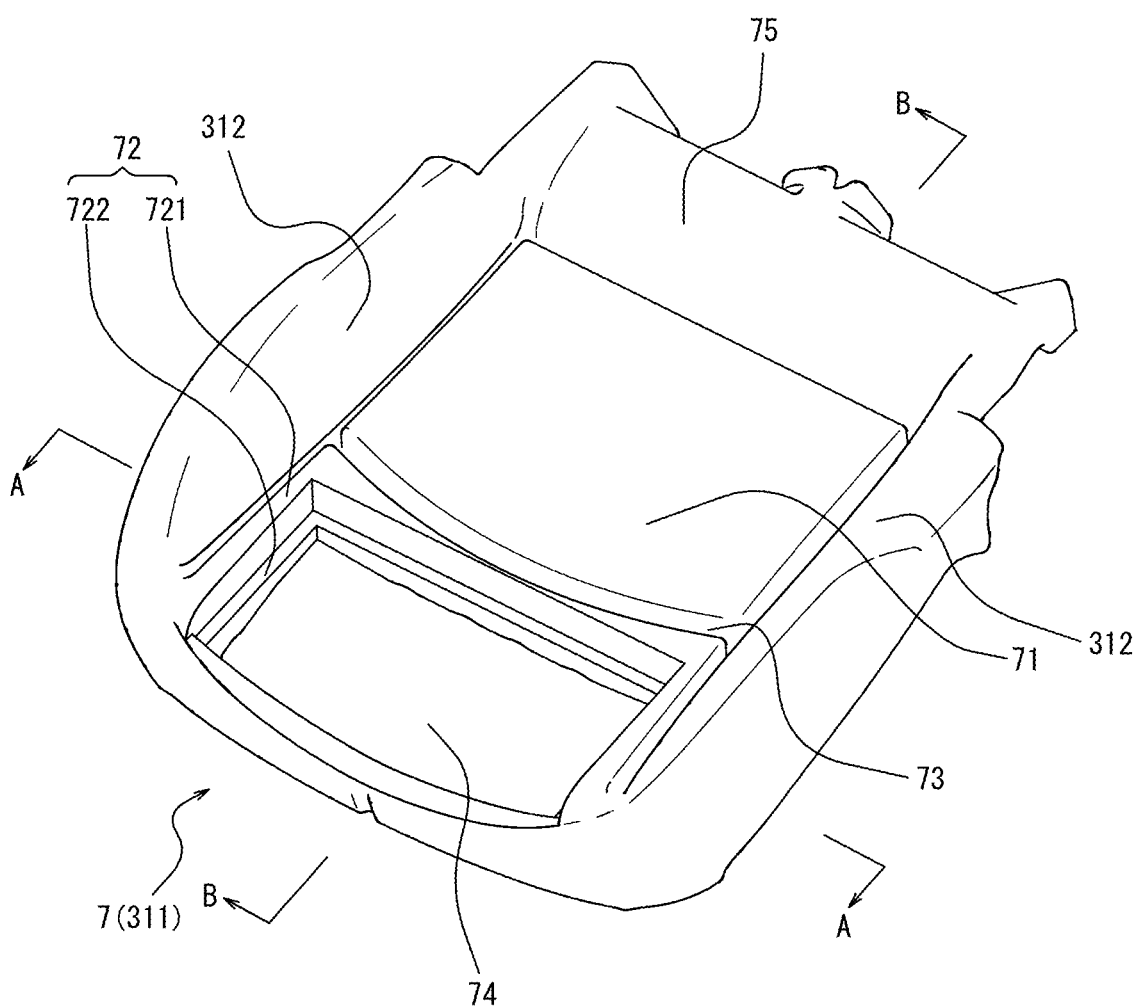
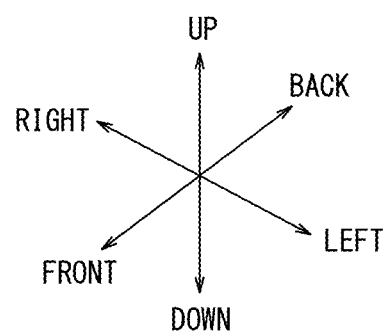

FIG. 19
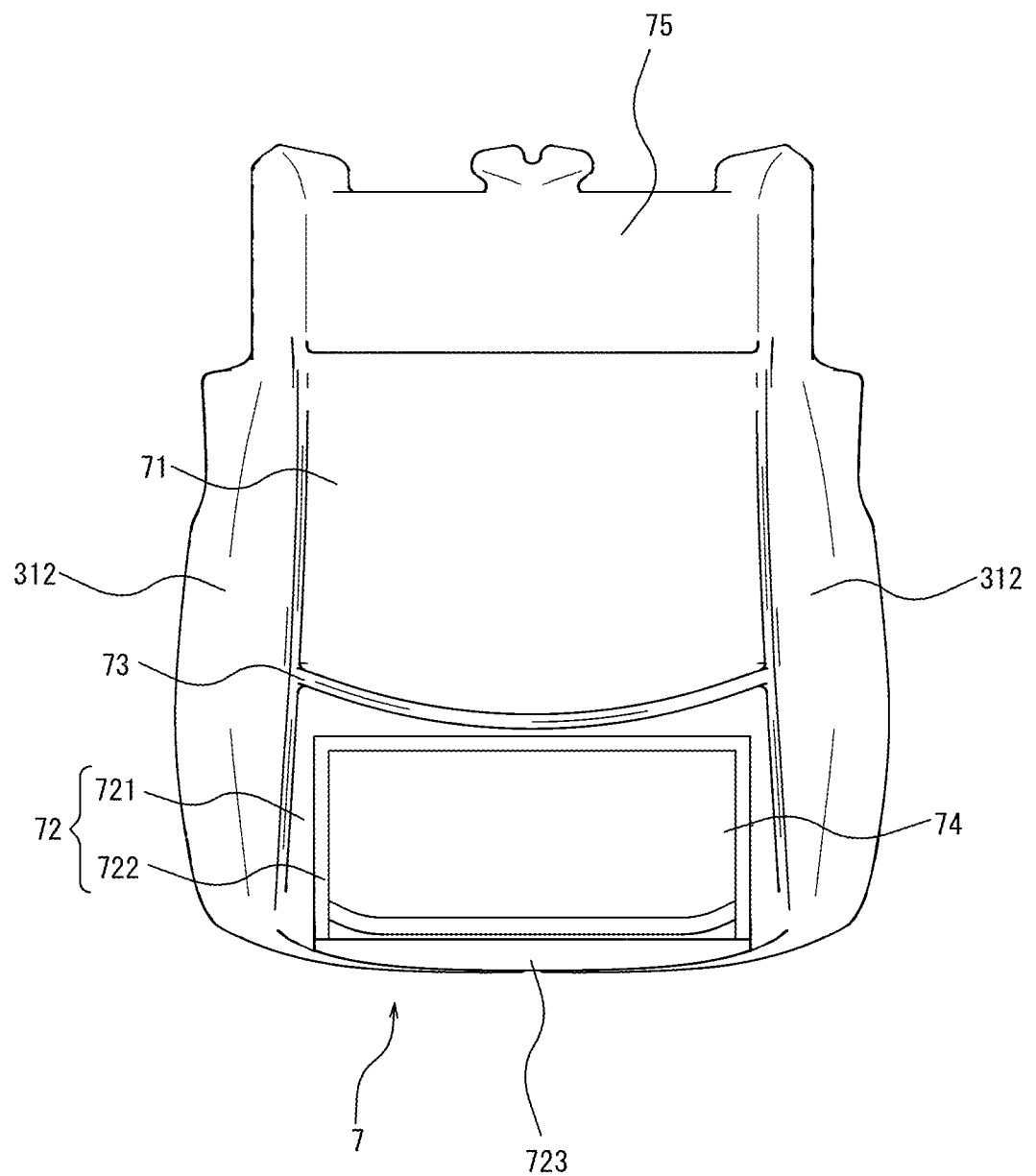
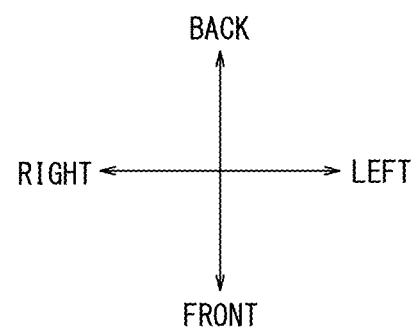

FIG. 22
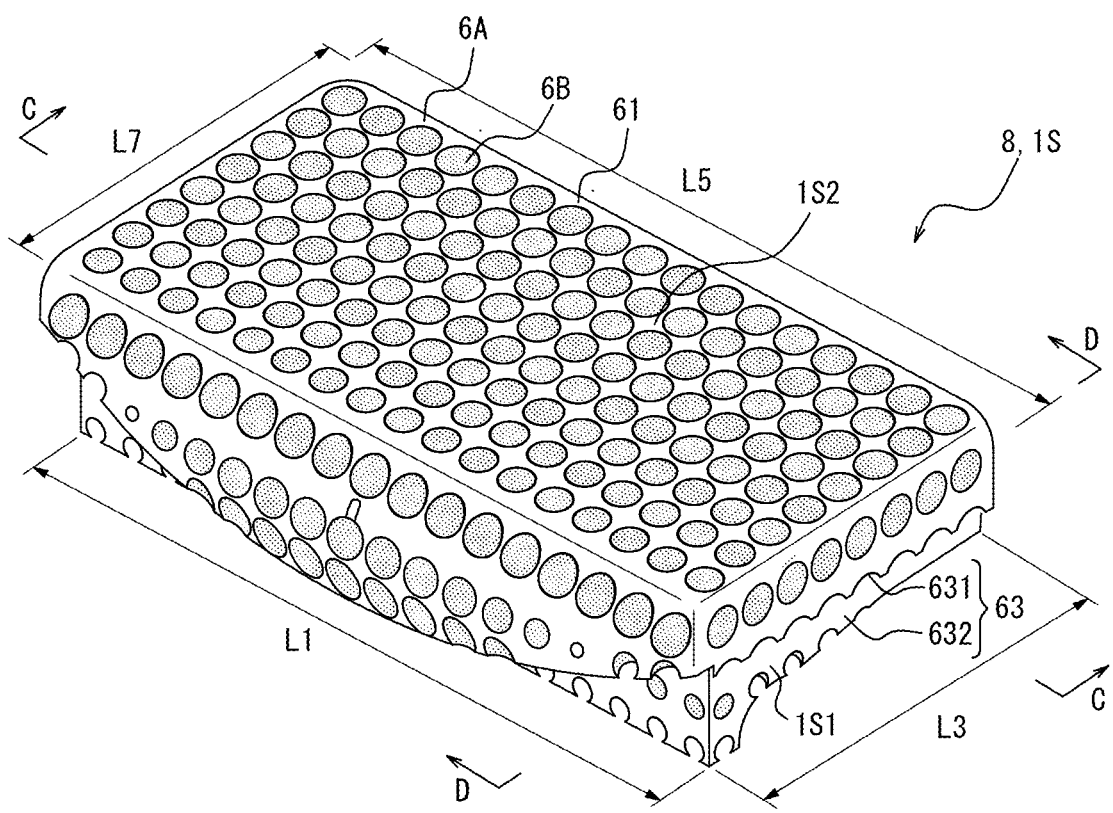
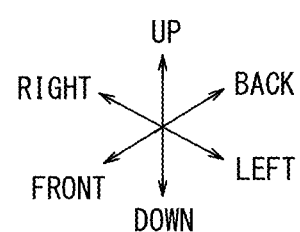

FIG. 28
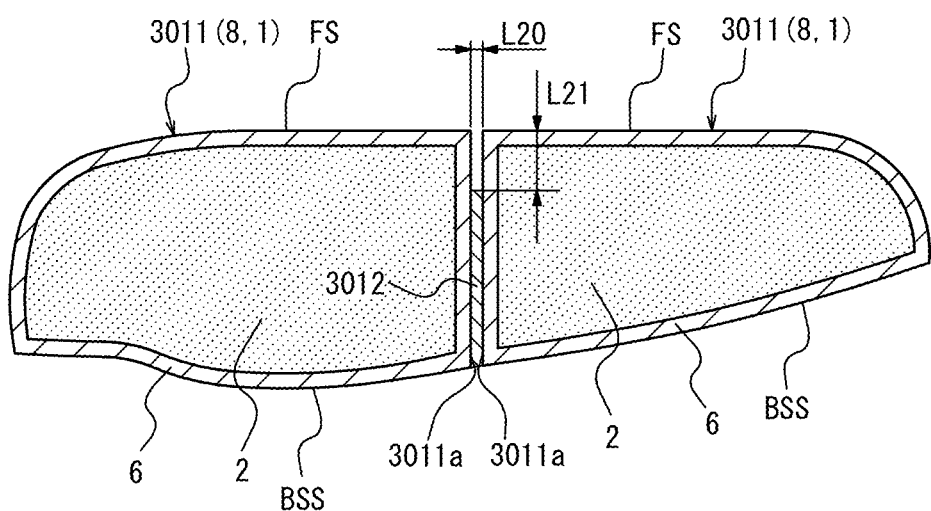
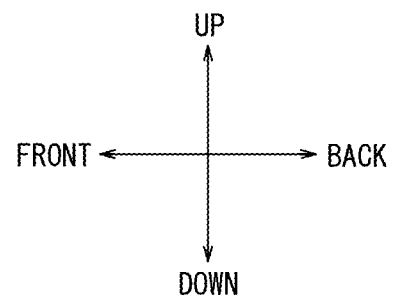

FIG. 29
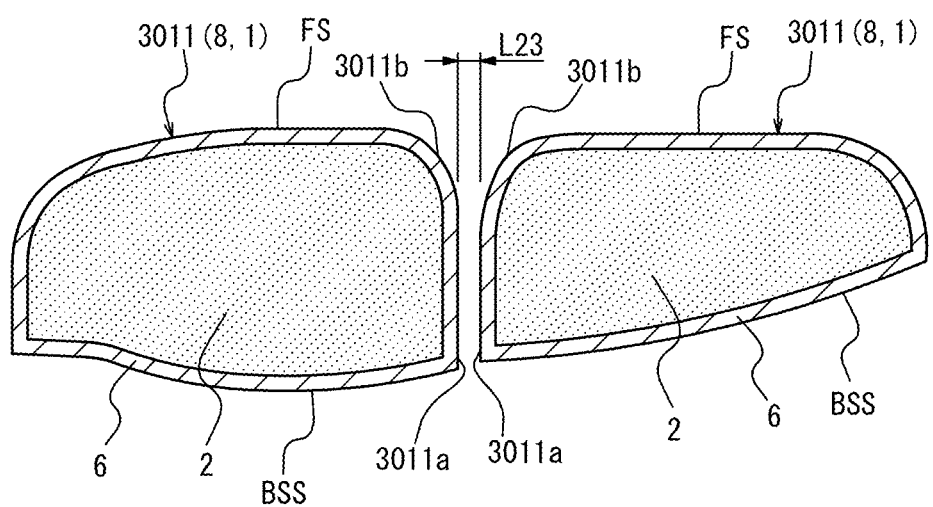
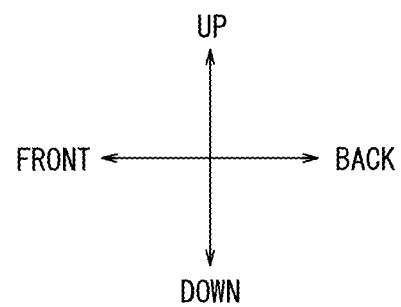

FILLING-BODY MANUFACTURING METHOD, PASSENGER-SEAT-CUSHION-MEMBER MANUFACTURING METHOD, AND FILLING BODY

TECHNICAL FIELD

The present disclosure relates to a filling-body manufacturing method, a passenger-seat-cushion-member manufacturing method, and a filling body.

The present application is based on and claims the benefit of priority of Japanese Patent Application No. 2018-226825 filed on Dec. 3, 2018 in Japan; the entire contents of which are incorporated hereby by reference.

BACKGROUND

Conventionally, a porous structural body (for example, urethane foam) having a cushioning characteristic has been manufactured through the process of foaming by chemical reaction in, for example, mold shaping (for example, PTL 1).

CITATION LIST

Patent Literature

PTL 1: Japanese Patent Laid-Open No. 2016-44292

SUMMARY

Technical Problem

However, when a porous structural body is manufactured through the process of foaming by chemical reaction as described above, it is not easy to adjust entirely or locally various characteristics of the porous structural body as requested. Thus, when a porous structural body is used as a filling body of a passenger-seat cushion member, it is not easy to adjust characteristics of the filling body as requested.

The present disclosure is intended to provide a filling-body manufacturing method capable of easily obtaining a filling body, characteristics of which can be easily adjusted, a passenger-seat-cushion-member manufacturing method capable of obtaining a passenger-seat cushion member that can easily achieve various requested characteristics, and a filling body, characteristics of which can be easily adjusted.

Solution to Problem

A filling-body manufacturing method of the present disclosure is

A filling-body manufacturing method of manufacturing a filling body that fills a hole part formed at a seat body in a passenger-seat cushion member including the seat body and the filling body, the filling body being a porous structural body made of flexible resin or rubber, the filling-body manufacturing method including a shaping step of shaping the filling body by using a 3D printer.

A passenger-seat-cushion-member manufacturing method of the present disclosure is a method of manufacturing a passenger-seat cushion member including a seat body and a filling body that fills a hole part formed at the seat body, the filling body being a porous structural body made of flexible resin or rubber, the passenger-seat-cushion-member manufacturing method including:

a shaping step of shaping the filling body by using a 3D printer; and a filling step of filling the hole part formed at the seat body with the filling body obtained in the shaping step.

It is preferable that a filling body of the present disclosure is a filling body that fills a hole part formed at a seat body and at least part of which is bonded to the seat body in a passenger-seat cushion member including the seat body and the filling body, the filling body being a porous structural body made of flexible resin or rubber, the filling body is shaped by using a 3D printer.

Advantageous Effect

According to the present disclosure, it is possible to provide a filling-body manufacturing method capable of easily obtaining a filling body, characteristics of which can be easily adjusted, a passenger-seat-cushion-member manufacturing method capable of obtaining a passenger-seat cushion member that can easily achieve various requested characteristics, and a filling body, characteristics of which can be easily adjusted.

BRIEF DESCRIPTION OF THE DRAWINGS

In the accompanying drawings:

FIG. 18 is a perspective view illustrating a seat body in the main pad in FIG. 17;

FIG. 19 is a top view illustrating the seat body in FIG. 18;

FIG. 22 is a perspective view illustrating a filling body in the main pad in FIG. 17;

FIG. 24 is a D-D cross-sectional view of the porous structural body in

FIG. 22;

FIG. 28 is a drawing for description of the passenger-seat cushion member in FIG. 27; and FIG. 29 is a drawing for description of a second modification of the passenger-seat cushion member that can include the porous structural body according to an optional embodiment of the present disclosure.

DETAILED DESCRIPTION

Figure 1:
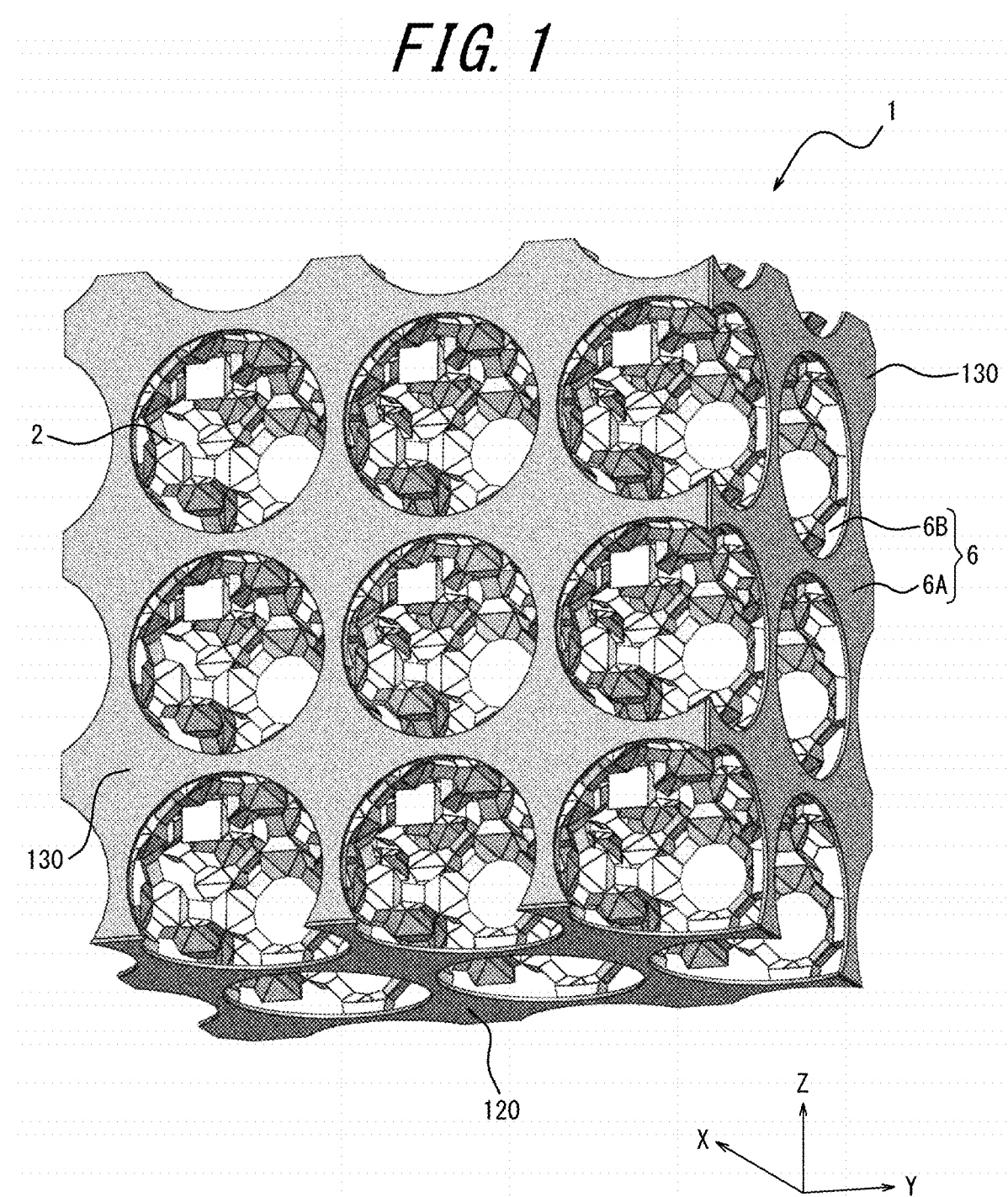
FIG. 1 is an external perspective view of a porous structural body according to an embodiment of the present disclosure.

Embodiments of a filling-body manufacturing method, a passenger-seat-cushion-member manufacturing method, and a filling body according to the present disclosure will be exemplarily described below with reference to the accompanying drawings.

Any common component in the drawings will be denoted by the same reference-sign.

In FIGS. 1 to 11 and 13 to 15, the orientation of an XYZ orthogonal coordinate system fixed to a porous structural body is illustrated to facilitate understanding of the orientation of the porous structural body.

First, the porous structural body according to an embodiment of the present disclosure will be described below with reference to FIGS. 1 to 12.

Figure 2:
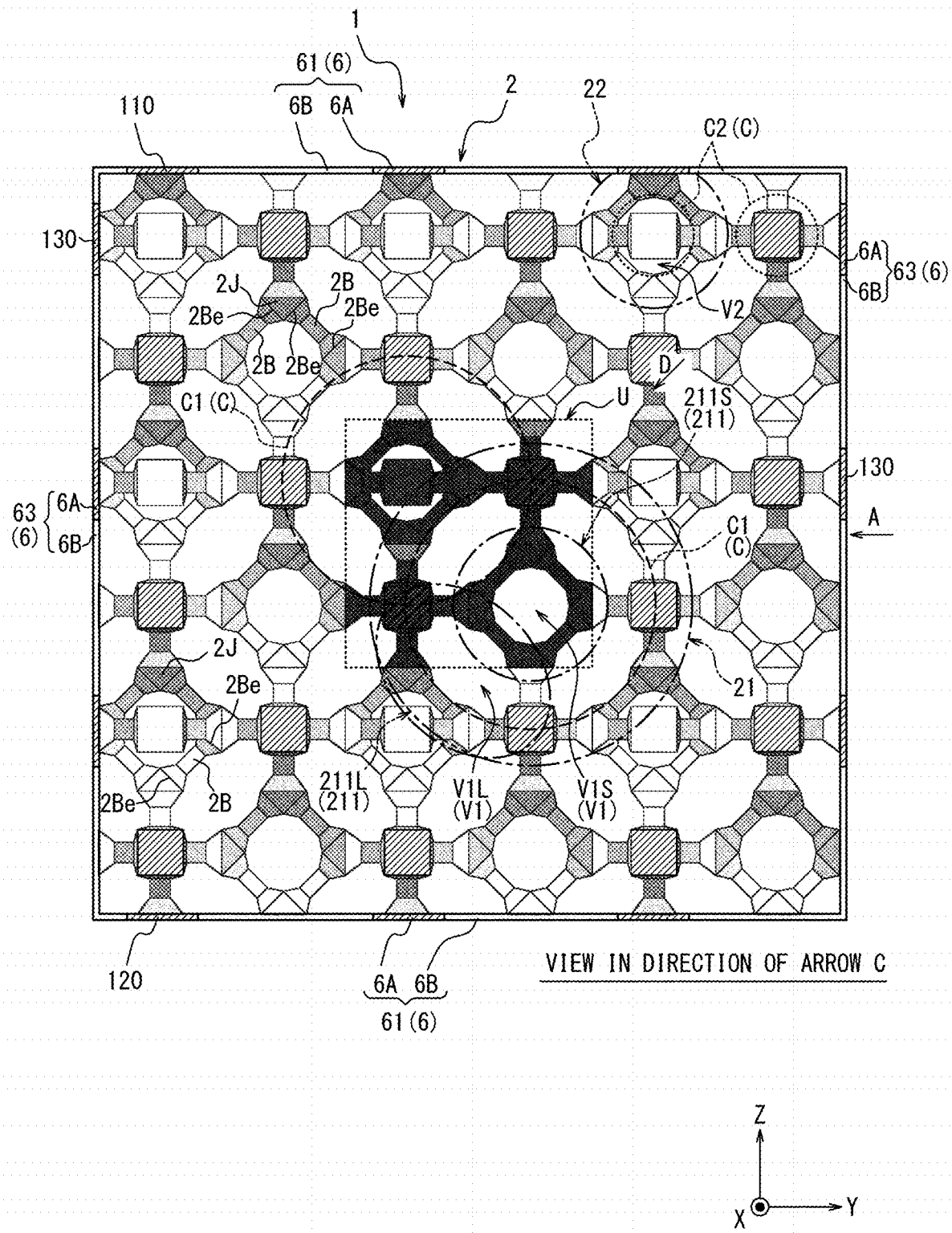
FIG. 2 is a cross-sectional view illustrating part of the porous structural body in FIG. 1 being viewed in the direction of arrow C in FIGS. 3 to 5.
Figure 3:
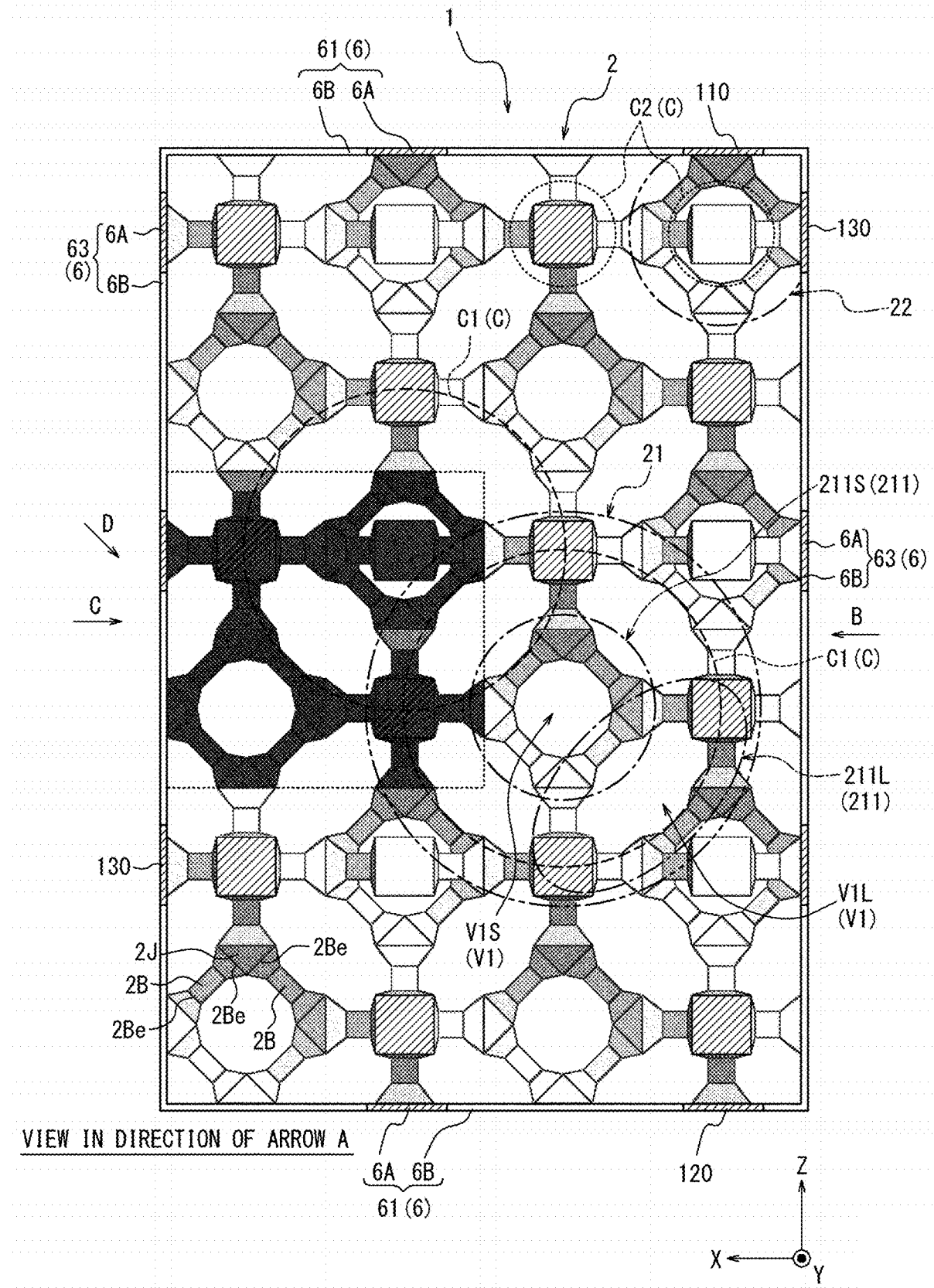
FIG. 3 is a cross-sectional view illustrating part of the porous structural body in FIG. 1 being viewed in the direction of arrow A in FIGS. 2, 4, and 5.
Figure 4:
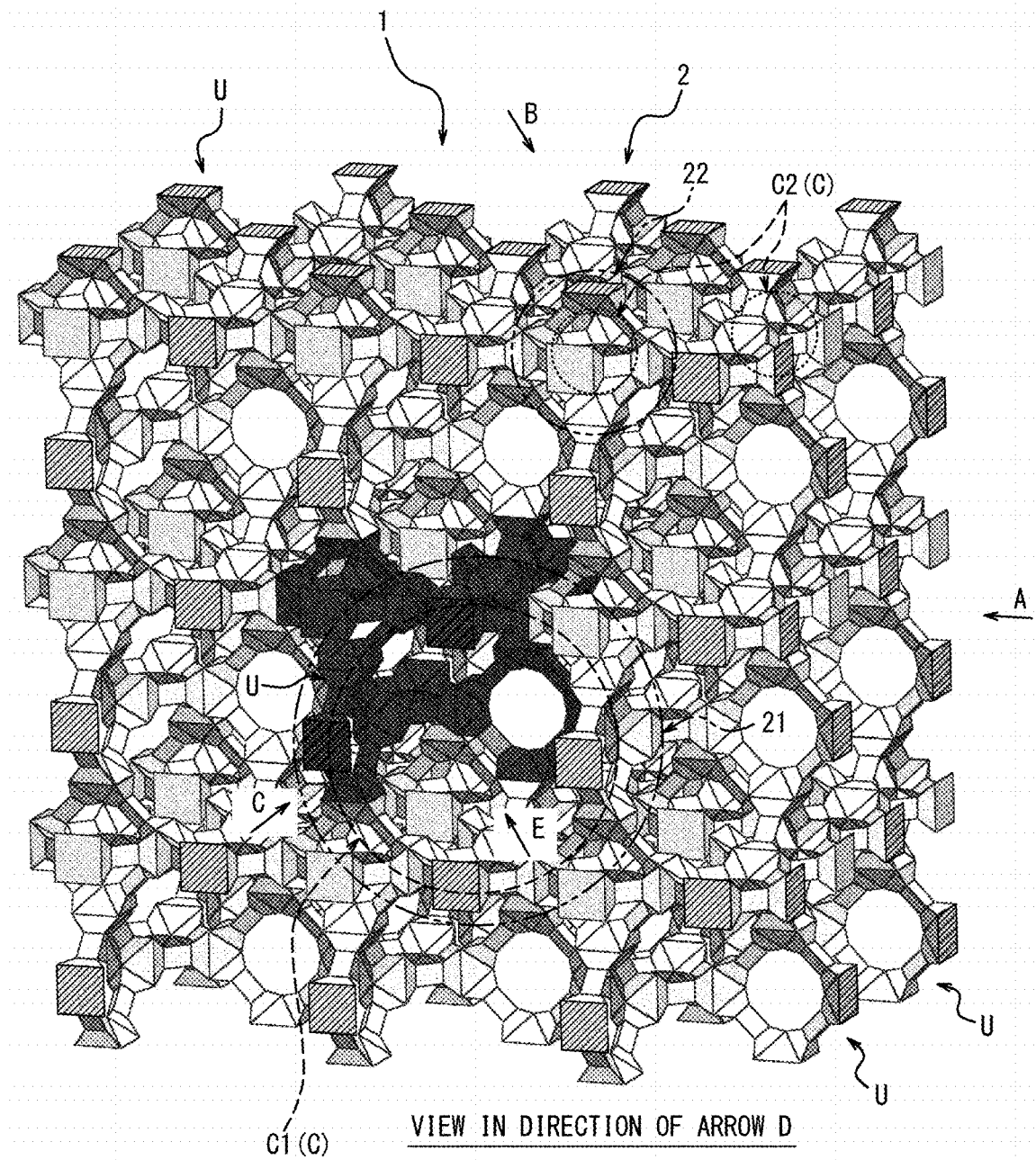
FIG. 4 is a perspective view illustrating a skeleton part of the porous structural body in FIG. 1 being viewed in the direction of arrow D in FIGS. 2, 3, and 5.
Figure 5:
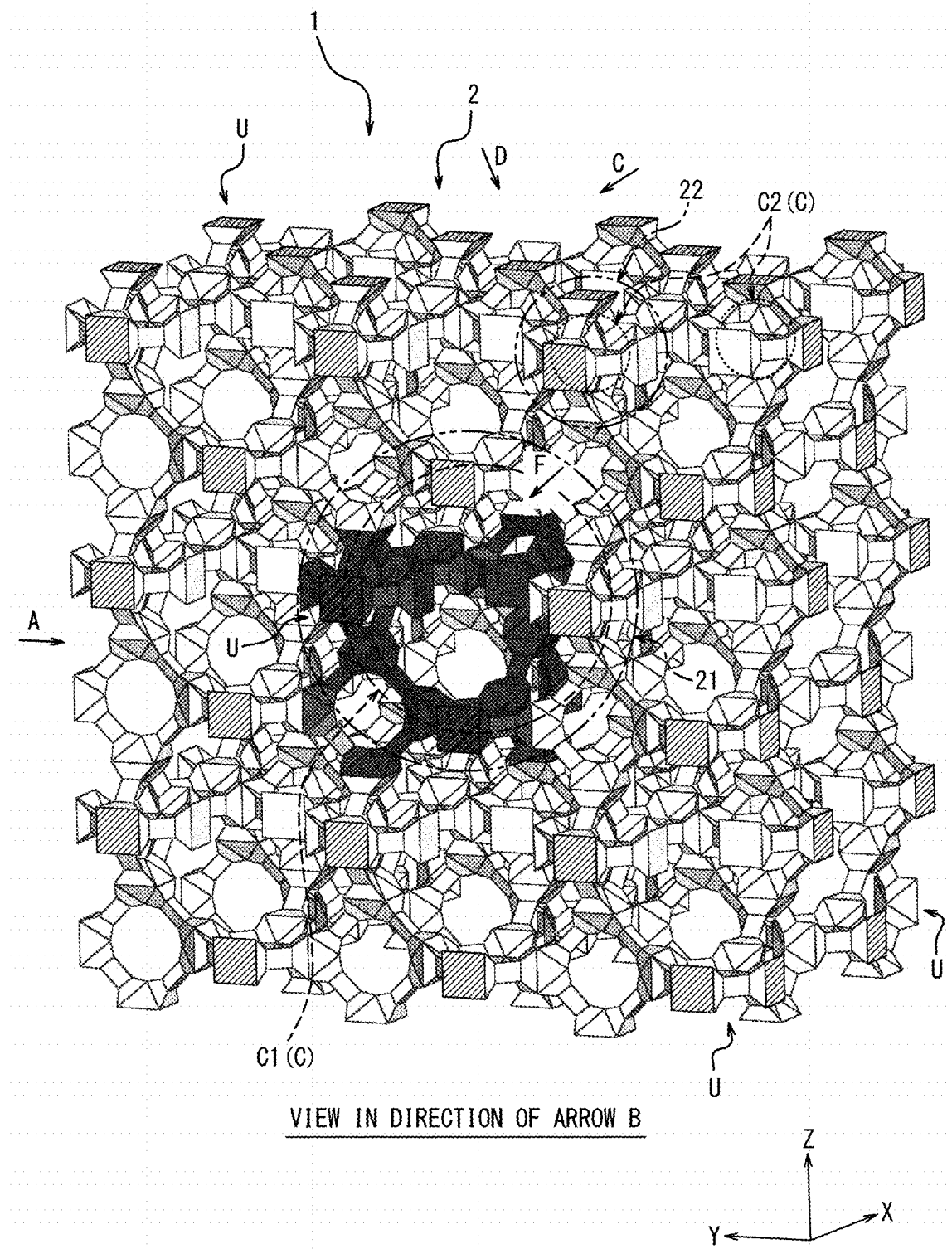
FIG. 5 is a perspective view illustrating the skeleton part of the porous structural body in FIG. 1 being viewed in the direction of arrow B in FIGS. 3 and 4.

FIG. 1 is an external perspective view of a porous structural body 1 according to the present embodiment. In FIGS. 2 to 5, a part cut into a rectangular parallelepiped in the porous structural body 1 illustrated in FIG. 1 is viewed at different angles, respectively. In FIG. 2, one surface of the part of the porous structural body 1 is seen in planar view, in other words, the part of the porous structural body 1 is viewed in the direction (-X direction) of arrow C in FIGS. 3 to 5. In FIG. 3, a surface of the part of the porous structural body 1 on the right side in FIG. 2 is seen in planar view, in other words, the part of the porous structural body 1 is viewed in the direction (-Y direction) of arrow A in FIGS. 2, 4, and 5. In FIG. 4, a surface of the part of the porous structural body 1, which is same as that in FIG. 2 is obliquely viewed from above, in other words, the part of the porous structural body 1 is viewed in the direction of arrow D in FIGS. 2, 3, and 5. In FIG. 5, a surface of the part of the porous structural body 1 on a side opposite to that in FIGS. 2 and 4 is obliquely viewed from above, in other words, the part of the porous structural body 1 is viewed in the direction of arrow B in FIGS. 3 and 4.

The porous structural body 1 of the present embodiment is shaped by a 3D printer. Since the porous structural body is manufactured by using a 3D printer, the porous structural body can be easily manufactured as compared to a case in which the porous structural body undergoes the process of foaming by chemical reaction as in conventional cases, and a desired configuration can be obtained. In addition, it is expected that manufacturing by a 3D printer can be achieved at low cost in a shorter time in the future due to upcoming progress of 3D printer technologies.

In the example illustrated in FIG. 1, the stereoscopic shape of the porous structural body 1 is a rectangular parallelepiped. However, the stereoscopic shape of the porous structural body 1 is not limited to a rectangular parallelepiped but may be an optional shape such as a sphere.

The porous structural body 1 is made of flexible resin or rubber. The porous structural body 1 includes a skeleton part 2 as a skeleton of the porous structural body 1, a large number of cell holes C defined by the skeleton part 2, and a top skin part 6 that is formed on at least part of the outer side of the skeleton part 2 to block at least some of the plurality of cell holes and integrated with the skeleton part 2 and at least part of an outer side of the top skin part 6 is a surface.

The skeleton part 2 exists in substantially the entire porous structural body 1 and is made of flexible resin or rubber. In the present example, part of the porous structural body 1 other than the skeleton part 2 and the top skin part 6 is a void space.

The "flexible resin" is resin that can deform when external force is applied, and is preferably, for example, elastomer resin, more preferably polyurethane, further more preferably soft polyurethane. The rubber is, for example, natural rubber or synthetic rubber. The porous structural body 1, which is made of flexible resin or rubber, can perform compressing and restoring deformation in accordance with application and cancellation of external force and can have a cushioning characteristic.

Note that, for the easiness of manufacturing by a 3D printer, the porous structural body 1 is more preferably made of flexible resin than made of rubber.

Note that, when the porous structural body 1 is manufactured by using a 3D printer, resin of light-curing polyurethane (in particular, ultraviolet curing polyurethane) as a raw material can be used as a material of the porous structural body 1. The light-curing polyurethane (in particular, ultraviolet curing polyurethane) may be resin of urethane acrylate or urethane methacrylate as a raw material. Such resin is, for example, disclosed in U.S. Pat. No. 4,337,130.

The skeleton part 2 of the porous structural body 1 of the present embodiment has a configuration in which a plurality of unit parts U having cube shapes are continuously integrated in X, Y, and Z directions. The part of the skeleton part 2 of the porous structural body 1 illustrated in FIGS. 2 to 5 is made of 18 unit parts U constituted by three unit parts arrayed in the Z direction, three unit parts arrayed in the Y direction, and two unit parts arrayed in the X direction. In the present example, the configuration, dimension, and orientation of each unit part U included in the porous structural body 1 are same. For convenience, one unit part U is colored in a gray color darker than those of the other unit parts U in FIGS. 2 to 5, and the outer edge of the unit parts U colored in the dark gray color is illustrated with a dotted line in FIGS. 1 and 2.

When the outer edge (outer outline) of each unit part U of the porous structural body 1 has a cube shape as in the present example, the same machine characteristics can be obtained in the X, Y, and Z directions.

Note that the outer edge (outer outline) of each unit part U may have a rectangular parallelepiped shape other than a cube shape, or another shape. The configurations and/or dimensions of the unit parts U included in the porous structural body 1 may not be completely identical but may be slightly different from one another. When the outer edge (outer outline) of each unit part U of the porous structural body 1 has a rectangular parallelepiped shape other than a cube shape, intentional anisotropy can be obtained as a function of the porous structural body 1. For example, when the porous structural body 1 is applied to a car seat pad, the outer edge (outer outline) of each unit part U can have a rectangular parallelepiped shape other than a cube shape, thereby providing softness, for example, in the Z direction (direction in which a person sits) to improve ride comfort.

Figure 6:
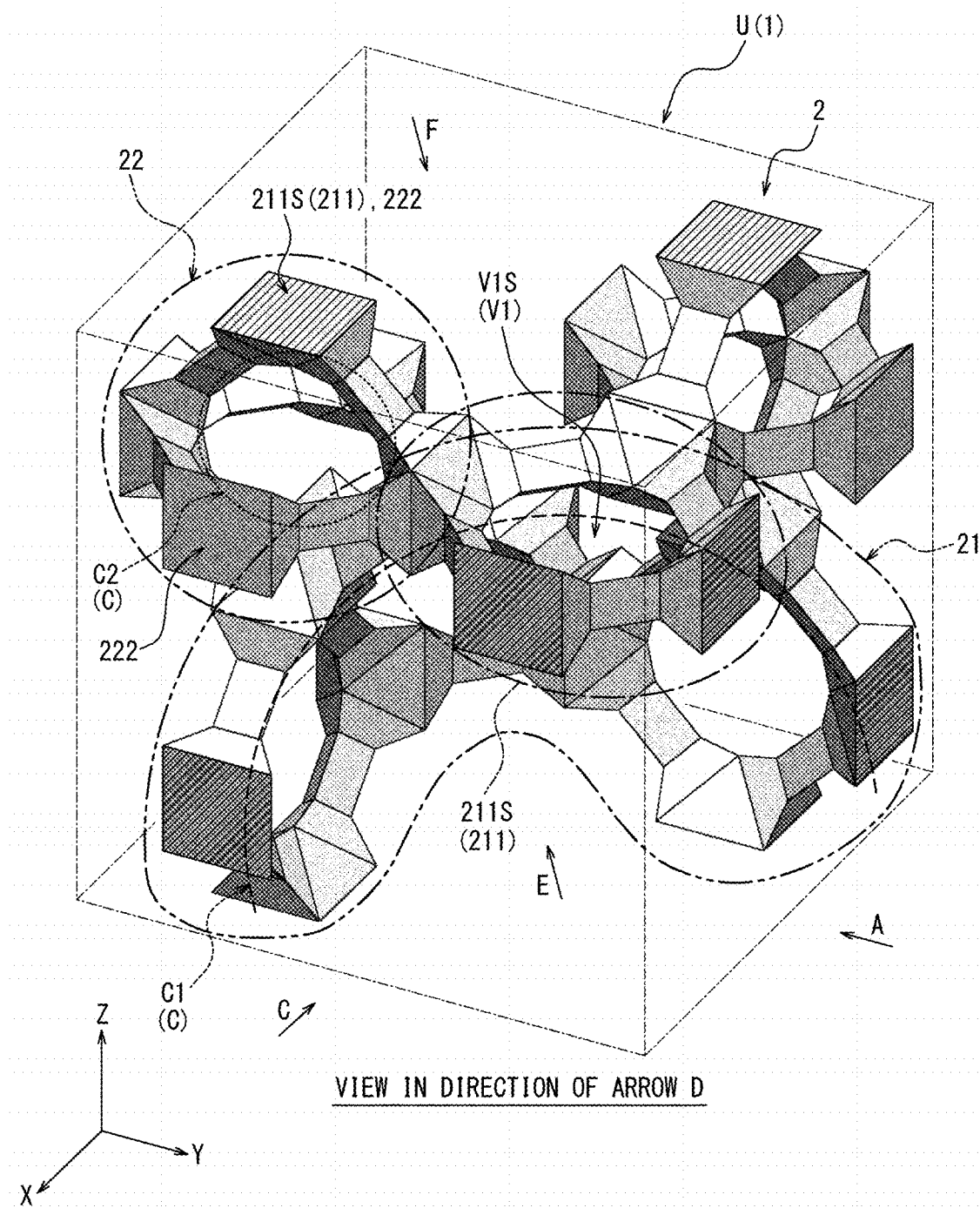
FIG. 6 is a perspective view illustrating a unit part of the skeleton part of the porous structural body in FIG. 1 is viewed being the direction of arrow D in FIGS. 2, 3, and 5.
Figure 7:
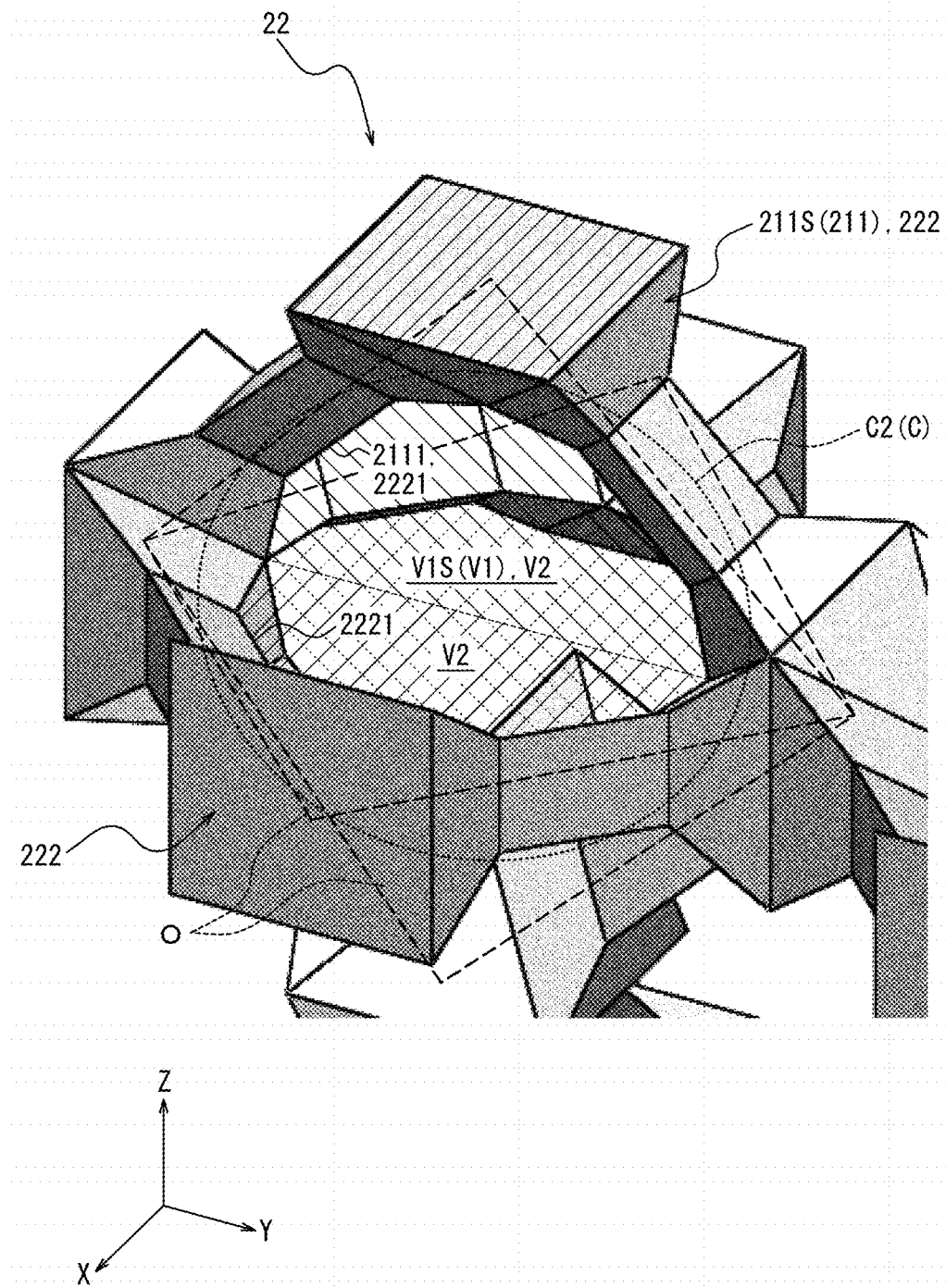
FIG. 7 is a perspective view illustrating part of the unit part of the skeleton part of the porous structural body in FIG. 6 being viewed in an enlarged manner.
Figure 8:
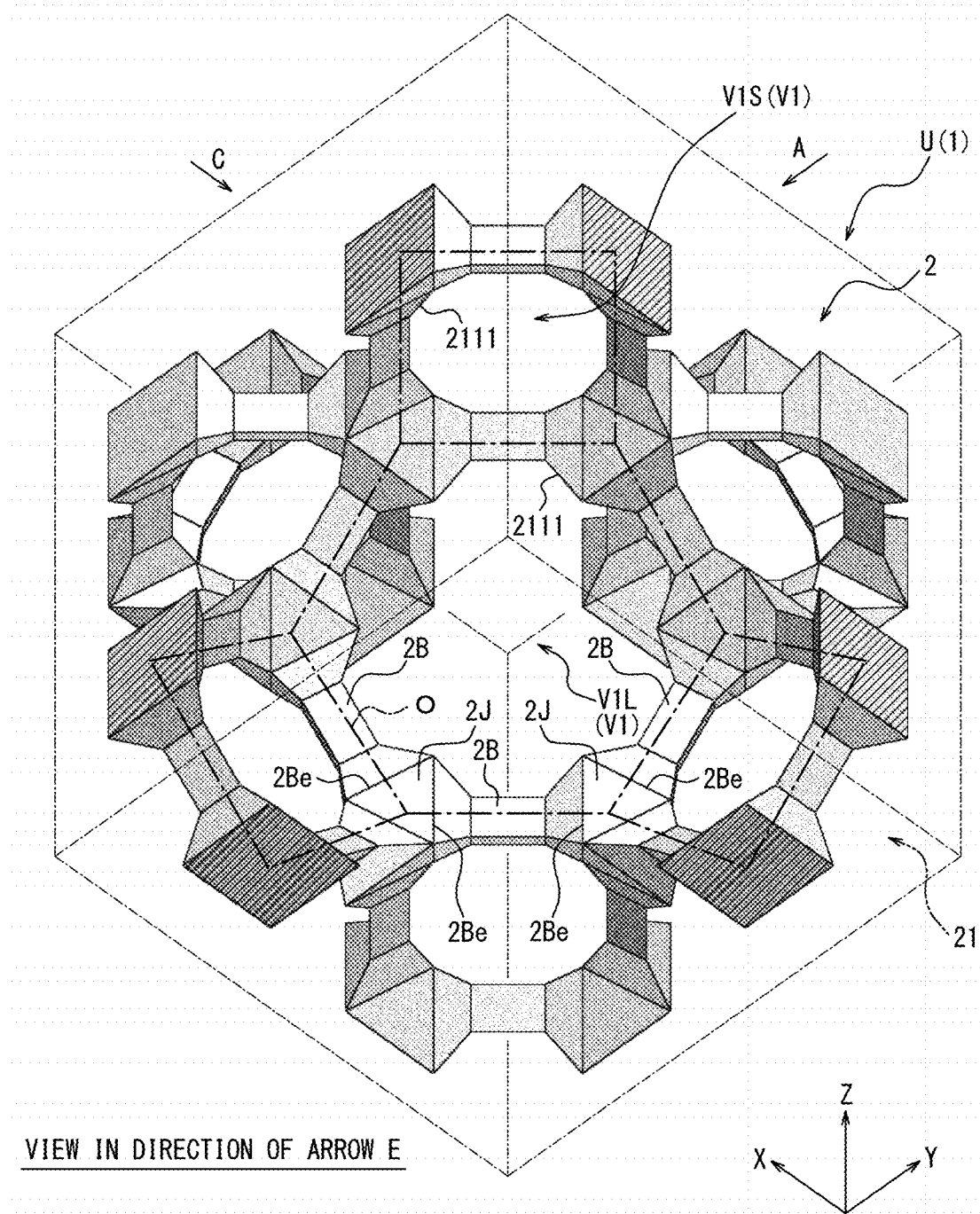
FIG. 8 is a perspective view illustrating the unit part of the skeleton part of the porous structural body in FIG. 6 being viewed in the direction of arrow E in FIG. 6.
Figure 9:
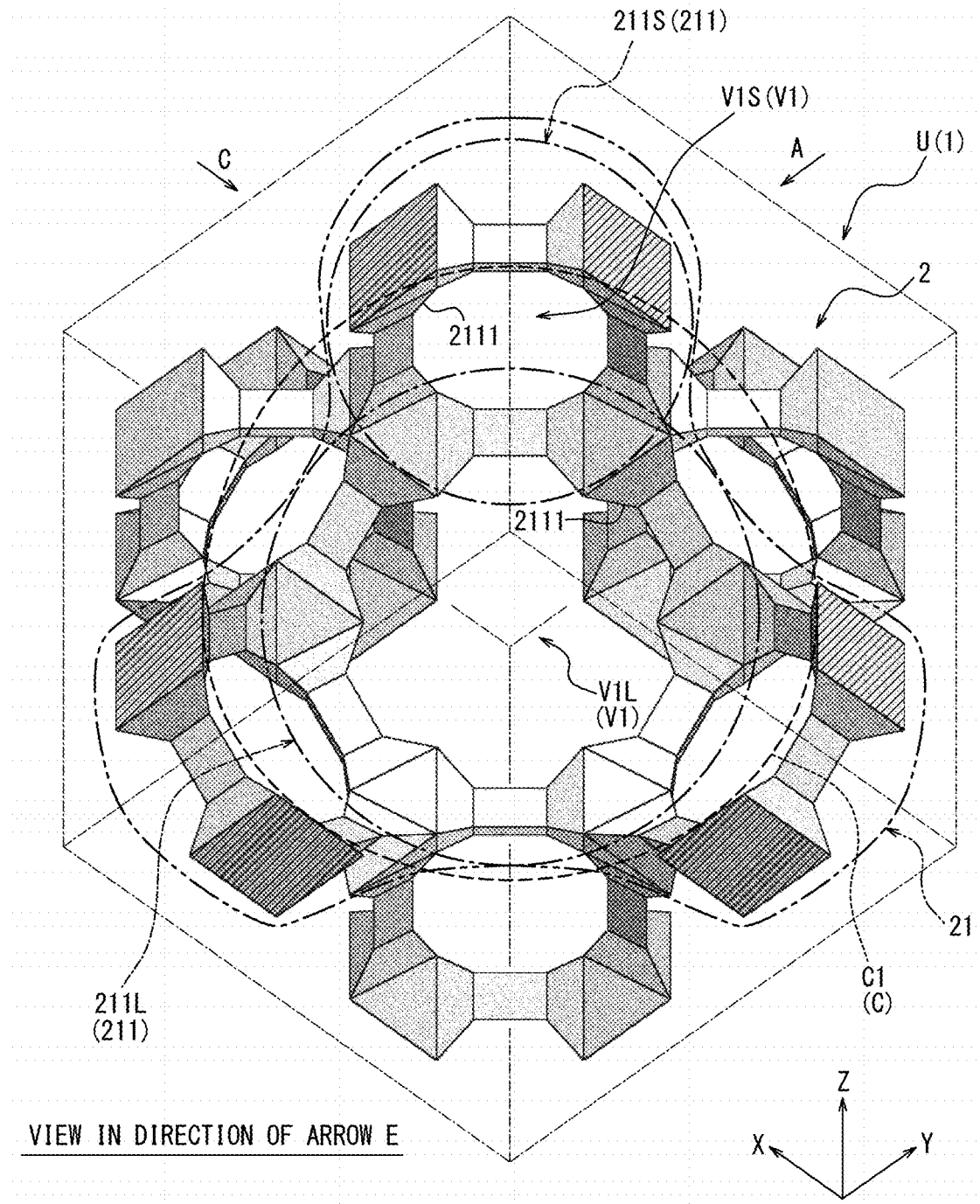
FIG. 9 is a drawing same as FIG. 8 with some reference signs, dashed lines, and dashed-dotted lines being different from those in FIG. 8.
Figure 10:
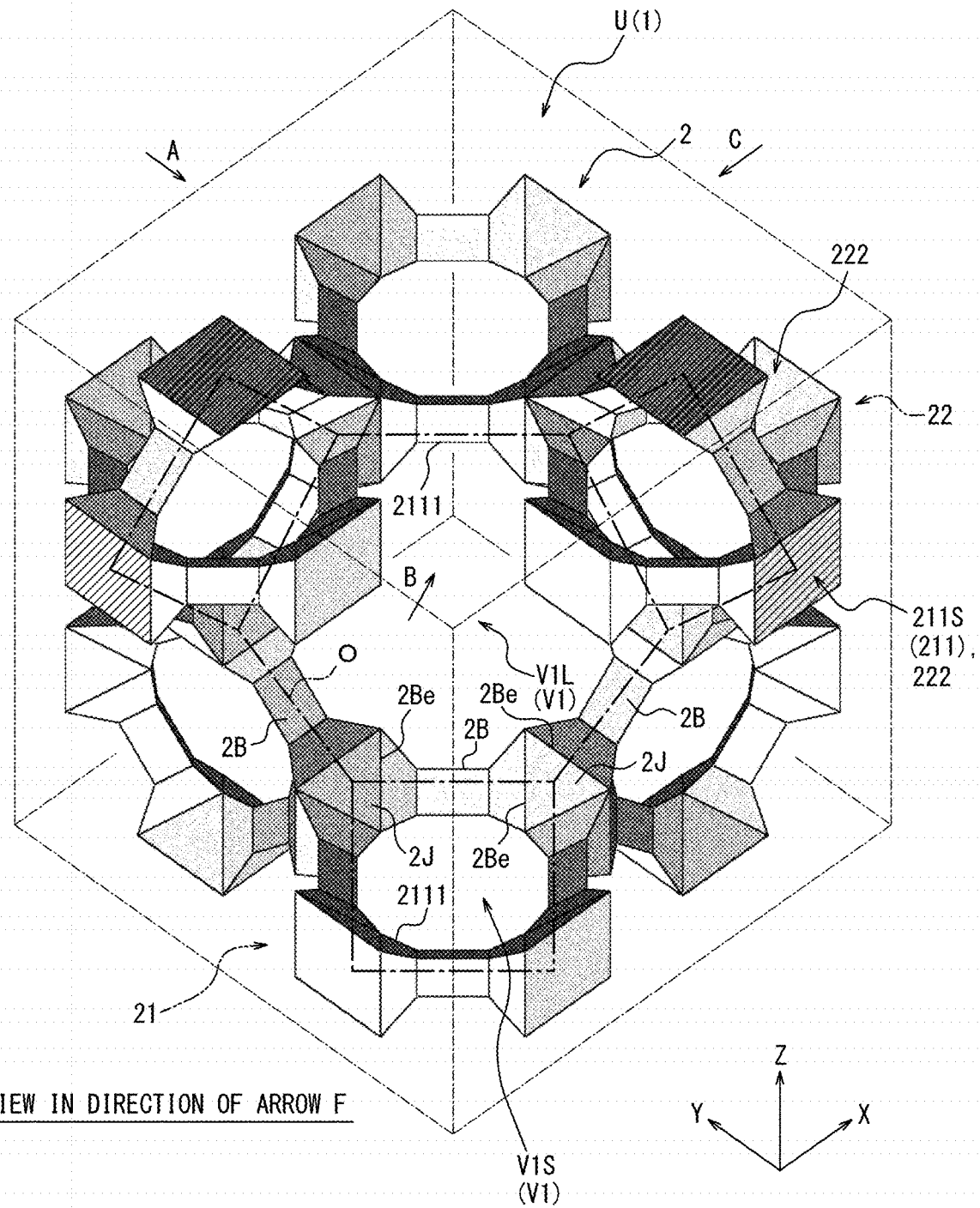
FIG. 10 is a perspective view illustrating the unit part of the skeleton part of the porous structural body in FIG. 6 being viewed in the direction of arrow F in FIG. 6.
Figure 11:
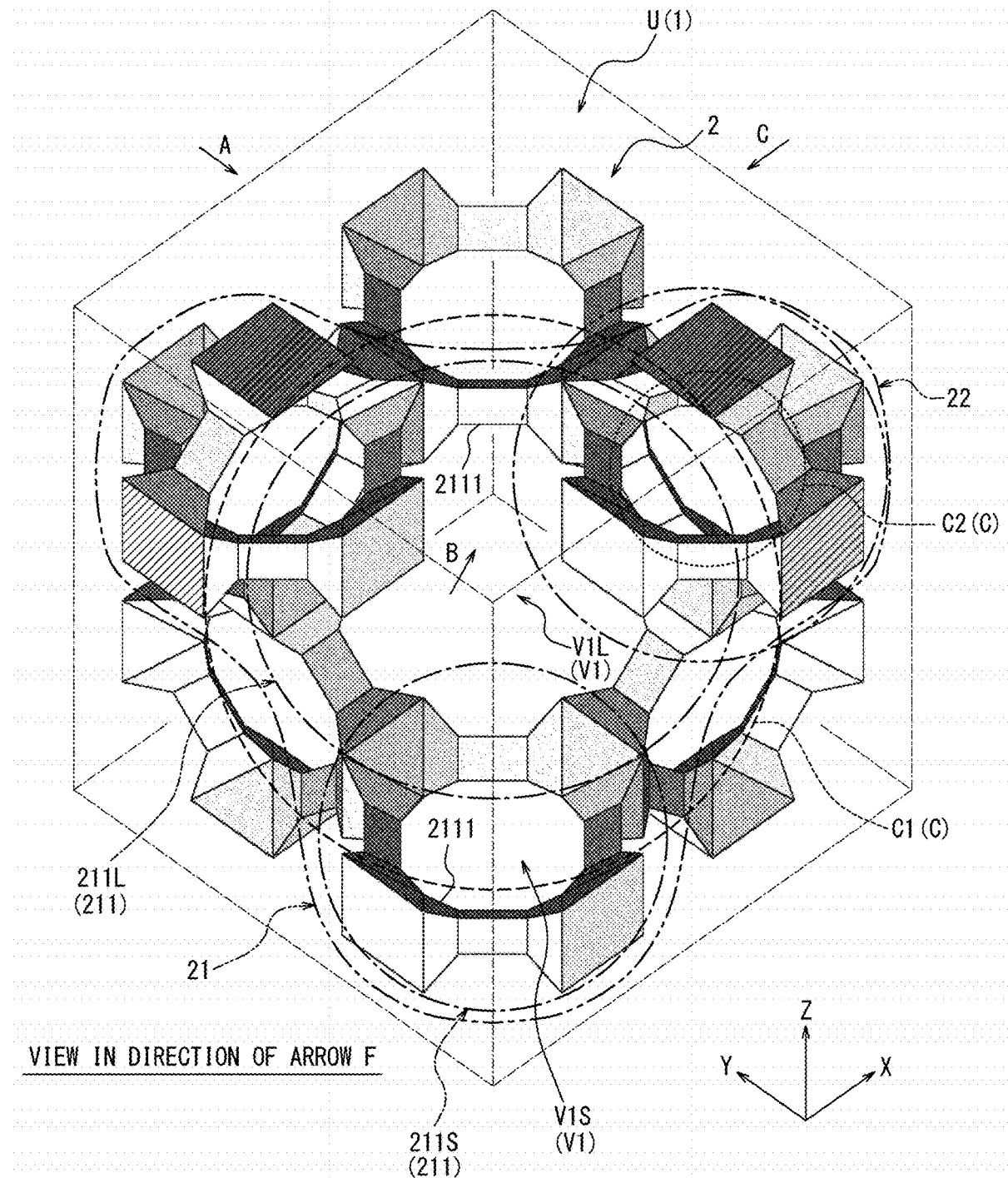
FIG. 11 is a drawing same as FIG. 10 with some reference signs, dashed lines, and dashed-dotted lines being different from those in FIG. 10.

FIGS. 6 to 11 illustrate one unit part U alone. In FIG. 6, the unit part U is viewed in a direction substantially same as that of FIG. 3, in other words, the unit parts U is viewed in the direction of arrow D in FIGS. 1 to 3, and 5. In FIG. 7, part of FIG. 6 is viewed in an enlarged manner. In FIGS. 8 and 9, which are the same drawing, part of the unit part U on a side same as that of FIG. 6 is viewed from below, in other words, the unit part U is viewed in the direction of arrow E in FIGS. 4 and 6. Only difference between FIGS. 8 and 9 is that different dashed lines and dashed-dotted lines are illustrated for visibility of the drawings. In FIGS. 10 and 11, which are the same drawing, part of the unit part U on a side opposite to that of FIG. 6 is viewed from above, in other words, the unit part U is viewed in the direction of arrow F in FIGS. 5 and 6. Only difference between FIGS. 10 and 11 is that different dashed lines and dashed-dotted lines are illustrated for visibility of the drawings. For reference, arrows A, B, and C in FIGS. 2 to 5 are also illustrated in FIGS. 6, and 8 to 11.

As illustrated in FIGS. 1 to 11, the skeleton part 2 of the porous structural body 1 is constituted by a plurality of bone parts 2B and a plurality of connection parts 2J, and the entire skeleton part 2 is integrated. Each bone part 2B has a column shape in the present example and extends straight in the present example. Each connection part 2J connects end parts 2Be in extension directions of a plurality (in the illustrated example, two to six) of bone parts 2B extending in directions different from each other, at a place where the end parts 2Be are adjacent to each other.

In FIGS. 7, 8, and 10, a skeleton line O of the skeleton part 2 is illustrated at part of the porous structural body 1. The skeleton line O of the skeleton part 2 includes a skeleton line O of each bone part 2B and a skeleton line O of each connection part 2J. The skeleton line O of each bone part 2B is the central axis of the bone part 2B and constituted by the central axis of a bone constant part 2B1 and the central axis of a bone change part 2B2 to be described later. The skeleton line O of each connection part 2J is an extended line part obtained when the central axes of bone parts 2B connected with the connection part 2J smoothly extend into the connection part 2J and are coupled with each other. The central axis of each bone part 2B is a line obtained by connecting the barycenter point of the shape of the bone part 2B in a section orthogonal to the extension direction of the bone part 2B at each point in the extension direction of the bone part 2B.

The extension direction of each bone part 2B is the extension direction of the skeleton line O of the bone part 2B (a part corresponding to the bone part 2B in the skeleton line O; this is same in the following).

The porous structural body 1, which substantially entirely includes the skeleton part 2, can perform compressing and restoring deformation in accordance with application and cancellation of external force while ensuring the breathability, and thus has excellent characteristics as a cushion member. Moreover, the porous structural body 1 has a simple structure and thus can be easily shaped by a 3D printer.

Note that some or all of the bone parts 2B included in the skeleton part 2 may extend in curved shapes. In this case, since some or all bone parts 2B are curved, it is possible to prevent abrupt shape change of the bone parts 2B and thus the porous structural body 1 and reduce local buckling at weight input.

Each edge part (side part where a pair of surfaces adjacent to each other face) of the skeleton part 2 is angulated in the drawings but may be smoothly curved.

In the present example, the bone parts 2B included in the skeleton part 2 have substantially same shapes and lengths. However, the present disclosure is not limited to the present example, but the shapes and/or lengths of the bone parts 2B included in the skeleton part 2 may not be same, and for example, the shapes and/or lengths of some bone parts 2B may be different from those of the other bone parts 2B. In this case, different machine characteristics can be intentionally obtained by differentiating the shape and/or length of a bone part 2B at a particular part of the skeleton part 2 from the other part. For example, when the porous structural body 1 is applied to a car seat pad as in an example of FIG. 16 to be described later, part of a main pad 311 on a seating surface side (front surface side) may be for soft improving ride comfort, and a part 12 serving as a side pad 312 may be hard for providing a sense of being held.

Figure 12A:
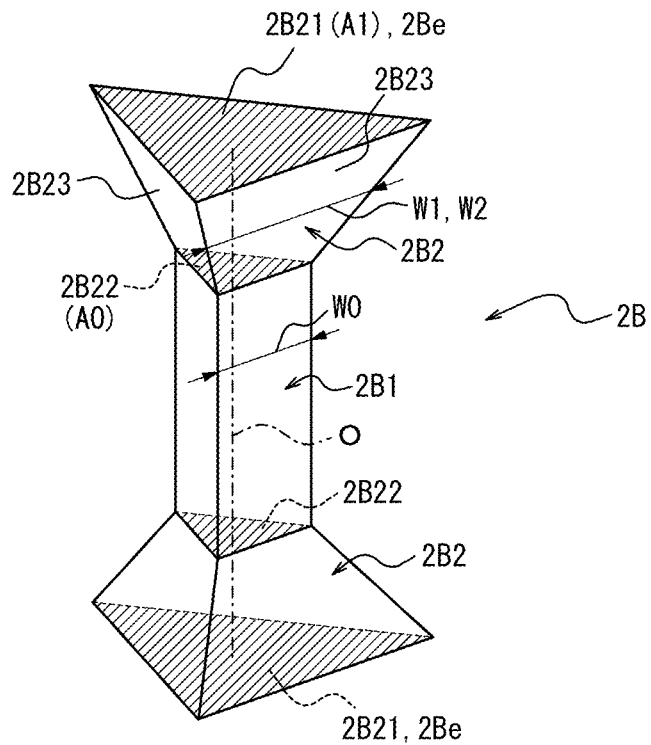
FIG. 12 (*a*) is a perspective view illustrating a bone part of the porous structural body in FIG. 2 in a state in which no external force is applied, and FIG. 12 (b) is a perspective view illustrating the bone part in FIG. 12 (a) in a state in which external force is applied.
Figure 12B:
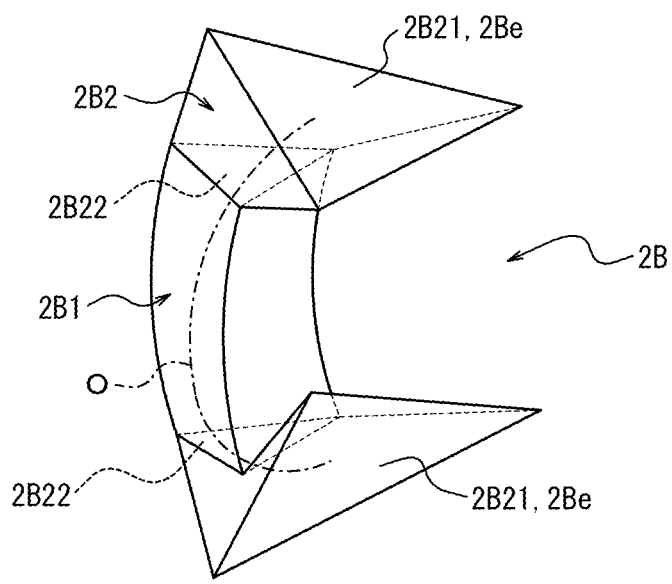

FIG. 12 illustrates each bone part 2B of the present example alone. FIG. 12 (*a*) illustrates a natural state in which no external force is applied to the bone part 2B, and FIG. 12 (*b*) illustrates a state in which external force is applied to the bone part 2B. In FIG. 12, the central axis (skeleton line O) of the bone part 2B is illustrated.

As illustrated in FIG. 12 (*a*), each bone part 2B is constituted by a bone constant part 2B1 extending while keeping cross-sectional area constant, and a pair of bone change parts 2B2 extending from the bone constant part 2B1 to the corresponding connection parts 2J while gradually changing cross-sectional area at both sides of the bone constant part 2B1 in the extension direction. In the present example, each bone change part 2B2 extends from the bone constant part 2B1 to the corresponding connection part 2J while gradually increasing cross-sectional area. Note that the present disclosure is not limited to the present example, but the same effect can be obtained when only some of the bone parts 2B included in the skeleton part 2 satisfy the above-described configuration. Some or all of the bone parts 2B included in the skeleton part 2 may each include a bone change part 2B2 only at an end part of the bone constant part 2B1 on one side whereas an end part of the bone constant part 2B1 on the other side may be directly connected with the corresponding connection part 2J, and in this case as well, the same effect can be obtained to some different extent.

The cross-sectional area of the bone constant part 2B1 and the cross-sectional area of the bone change part 2B2 are the cross-sectional area of a section of the bone constant part 2B1 and the cross-sectional area of a section of the bone change part 2B2, respectively, which are orthogonal to the skeleton line O.

In the present example, since each bone part 2B included in the porous structural body 1 is constituted by the bone constant part 2B1 and the bone change part 2B2 and the cross-sectional area of the bone change part 2B2 gradually increases as the position moves from the bone constant part 2B1 toward the corresponding connection part 2J, the bone part 2B has a constricted shape tapered toward the bone constant part 2B1 at a vicinity part of the boundary between the bone constant part 2B1 and the bone change part 2B2. Thus, when external force is applied, the bone part 2B is likely to perform buckling deformation at the constricted part and a middle part of the bone constant part 2B1, and accordingly, the porous structural body 1 is likely to perform compressed deformation. As a result, behavior and characteristics equivalent to those of typical poly urethane foam manufactured through the process of foaming by chemical reaction can be obtained. In addition, as a result, the surface of the porous structural body 1 provides softer touch. For example, when the porous structural body 1 is used as a passenger-seat cushion member (such as a car seat pad), a softer feeling is provided to a seated person when sitting, particularly when starting sitting. Such a soft feeling is typically widely appreciated, and is appreciated by a seated person on a seat pad of a luxury car (for example, a seated person on a backseat of chauffeured car).

When at least part of the bone part 2B includes the bone constant part 2B1 as in the present example, a ratio A0/A1 of cross-sectional area A0 (FIG. 12 (a)) of the bone constant part 2B1 relative to cross-sectional area A1 (FIG. 12 (a)) of an edge 2B21 of the bone part 2B on any one side (preferably, both sides) preferably satisfies:

$0.15 \leq A0/A1 \leq 2.0$

The ratio A0/A1 more preferably satisfies:

$0.5 \leq A0/A1 \leq 2.0$

Accordingly, the surface of the porous structural body 1 can provide touch of appropriate hardness, which is not too soft nor too hard, as a characteristic of a passenger-seat cushion member. For example, when the porous structural body 1 is used as a passenger-seat cushion member (such as a seat pad), a feeling of appropriate hardness is provided to a seated person when sitting, particularly when starting sitting. The surface of the porous structural body 1 provides softer touch as the ratio A0/A1 is smaller. When the ratio A0/A1 is smaller than 0.15, the surface of the porous structural body 1 potentially provides too soft touch, which is not preferable as a characteristic of a cushion member. When the ratio A0/A1 is larger than 2.0, the surface of the porous structural body 1 potentially provides too hard touch, which is not preferable as characteristics of a cushion member.

More specifically, in the present example, each bone part 2B includes the bone constant part 2B1 and the pair of bone change parts 2B2 continuous with both sides of the bone constant part 2B1, each bone change part 2B2 extends from the bone constant part 2B1 to the corresponding connection part 2J while gradually increasing cross-sectional area, and the ratio A0/A1 is smaller than 1.0. Accordingly, the surface of the porous structural body 1 can provide relatively soft touch as a characteristic of a cushion member, particularly as a characteristic of a passenger-seat cushion member. Such a soft feeling is typically widely appreciated, and is appreciated by a seated person on a seat pad of a luxury car (for example, a seated person on a backseat of chauffeured car).

Note that each bone part 2B included in the skeleton part 2 may satisfy the above-described configuration, or only some bone parts 2B included in the skeleton part 2 may satisfy the above-described configuration, and in any case, the same effect can be obtained to some different extent.

Note that, unlike the present example, each bone change part 2B2 may extend from the bone constant part 2B1 to the corresponding connection part 2J while gradually decreasing cross-sectional area. In this case, the bone constant part 2B1 has a cross-sectional area larger than that of the bone change part 2B2 (is thicker than the bone change part 2B2). Accordingly, the bone constant part 2B1 is unlikely to deform when external force is applied, and instead, buckling is relatively likely to occur at the bone change part 2B2 (in particular, a part on the connection part 2J side), and thus the porous structural body 1 is unlikely to perform compressed deformation. Accordingly, the surface of the porous structural body 1 provides harder touch, and a machine characteristic of high hardness is obtained. For example, the porous structural body 1 used as a passenger-seat cushion member provides a harder feeling to a seated person when sitting, particularly when starting sitting. Such a behavior is not easily obtained with typical poly urethane foam manufactured through the process of foaming by chemical reaction. With such a configuration, a user who prefers a harder feeling can be supported. Such a hard feeling is appreciated by, for example, a seated person on a seat pad of a sports car that performs abrupt acceleration and deceleration and lane change.

The ratio A0/A1 is larger than 1.0 when the bone change part 2B2 extends from the bone constant part 2B1 to the corresponding connection part 2J while gradually decreasing cross-sectional area.

Note that each bone part 2B included in the skeleton part 2 may satisfy the above-described configuration, or only some bone parts 2B included in the skeleton part 2 may satisfy the above-described configuration, and in any case, the same effect can be obtained to some different extent.

Figure 13:
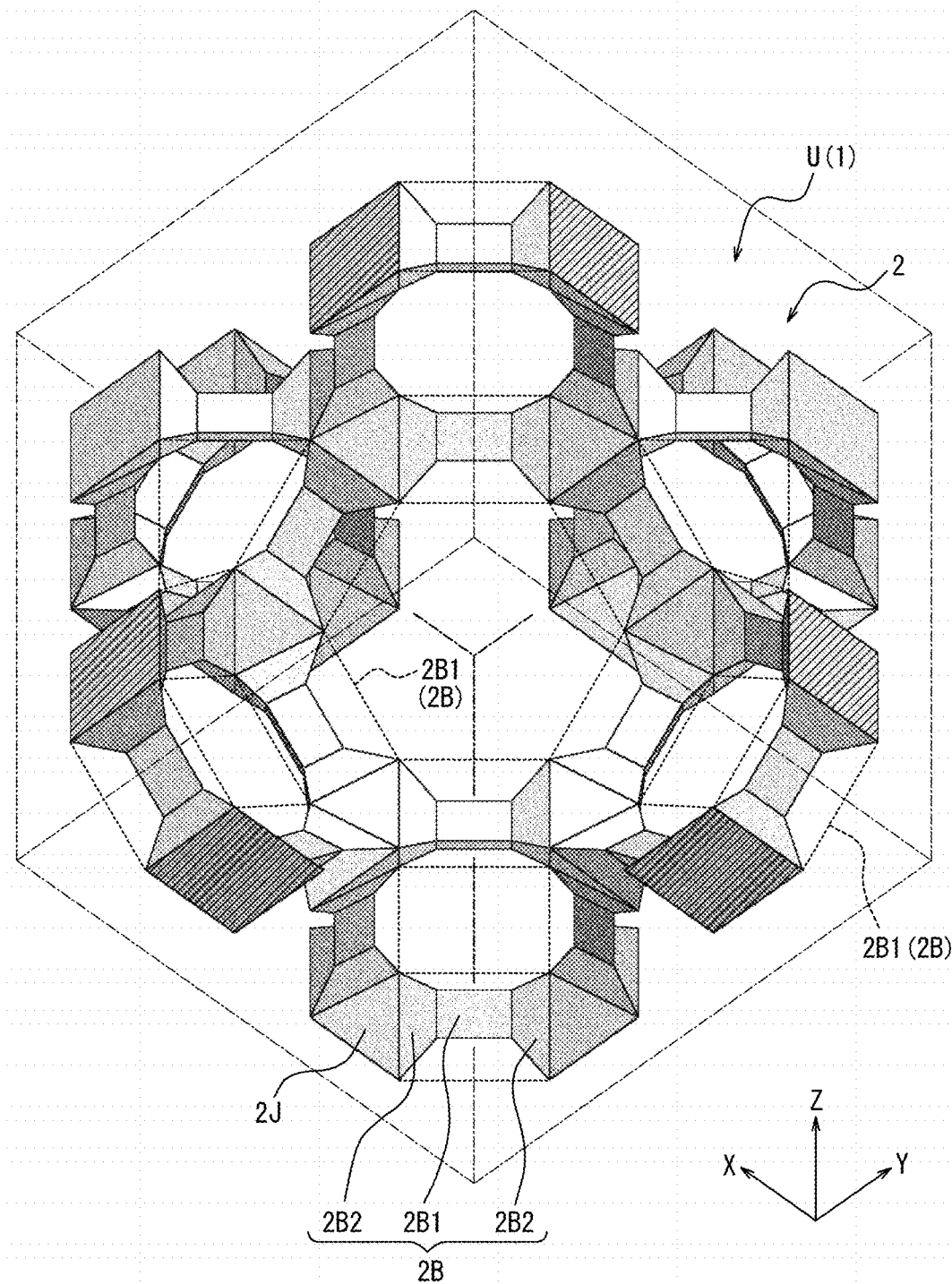
FIG. 13 is a drawing corresponding to FIG. 9, for description of the skeleton part of the porous structural body according to a first modification of the present disclosure.

Alternatively, as in a first modification illustrated with a partially dotted line in FIG. 13, each bone part 2B may include only the bone constant part 2B1 with no bone change part 2B2. In this case, the cross-sectional area of the bone part 2B is constant over its entire length. When external force is applied, the surface of the porous structural body 1 provides touch of intermediate hardness. With such a configuration, a user who prefers a feeling of intermediate hardness can be supported. The configuration can be applied suitably to a seat pad of any car type such as a luxury car or a sports car.

In this case, the ratio A0/A1 is 1.0.

Note that each bone part 2B included in the skeleton part 2 may satisfy the above-described configuration, or only some bone parts 2B included in the skeleton part 2 may satisfy the above-described configuration, and in any case, the same effect can be obtained to some different extent.

Returning to FIGS. 1 to 12, the cross-sectional area of the bone constant part 2B1 of each bone part 2B included in the skeleton part 2 is smaller than those of the bone change part 2B2 and the corresponding connection part 2J in the present example. More specifically, the cross-sectional area of the bone constant part 2B1 is smaller than the cross-sectional area of any part of each of the bone change part 2B2 and the connection part 2J (except for a boundary part between the bone constant part 2B1 and the bone change part 2B2). In other words, the bone constant part 2B1 is a part having a smallest cross-sectional area (narrowest) in the skeleton part 2. Accordingly, as described above, when external force is applied, the bone constant part 2B1 is likely to deform, and thus the porous structural body 1 is likely to perform compressed deformation. Accordingly, the surface of the porous structural body 1 provides softer touch.

Note that the cross-sectional area of each connection part 2J is the cross-sectional area of a section orthogonal to the skeleton line O of the connection part 2J.

Note that the present disclosure is not limited to the present example, but only some bone parts 2B included in the skeleton part 2 may satisfy the above-described configuration, and in this case as well, the same effect can be obtained to some different extent.

Similarly, in the present example, the width of the bone constant part 2B1 of each bone part 2B included in the skeleton part 2 is smaller than those of the bone change part 2B2 and the corresponding connection part 2J. More specifically, the width of the bone constant part 2B1 is smaller than the width of any part (except for the boundary part between the bone constant part 2B1 and the bone change part 2B2) of each of the bone change part 2B2 and the connection part 2J. In other words, the bone constant part 2B1 is a part having a smallest width (narrowest) in the skeleton part 2. Accordingly, when external force is applied, the bone constant part 2B1 is likely to deform, and thus the surface of the porous structural body 1 provides softer touch.

Note that the widths of the bone constant part 2B1, the bone change part 2B2, and the connection part 2J are measured maximum widths of sections of the bone constant part 2B1, the bone change part 2B2, and the connection part 2J, respectively, which are orthogonal to the skeleton line O. The skeleton line O of the connection part 2J is part of the skeleton line O corresponding to the connection part 2J. In FIG. 12 (a), a width W0 of the bone constant part 2B1 and a width W1 of the bone change part 2B2 are indicated for reference.

Note that the present disclosure is not limited to the present example, but only some bone parts 2B included in the skeleton part 2 may satisfy the above-described configuration, and in this case as well, the same effect can be obtained to some different extent.

In each above-described example, for simplification of the structure of the porous structural body 1 and the easiness of manufacturing by a 3D printer, the width W0 (FIG. 12) of the bone constant part 2B1 is preferably equal to or larger than 0.05 mm, more preferably equal to or larger than 0.10 mm. Shaping can be performed at the resolution of a 3D printer of high performance when the width W0 is equal to or larger than 0.05 mm, and shaping can be performed not only at the resolution of a 3D printer of high performance but also at the resolution of a general-purpose 3D printer when the width W0 is equal to or larger than 0.10 mm.

However, to improve the accuracy of the outer edge (outer outline) shape of the porous structural body 1, reduce the gap (interval) between the cell holes C, and have excellent characteristics as a cushion member, the width W0 (FIG. 12) of the bone constant part 2B1 is preferably 0.05 mm to 2.0 mm inclusive.

Note that each bone part 2B included in the skeleton part 2 preferably satisfies the above-described configuration, but only some bone parts 2B included in the skeleton part 2 may satisfy the above-described configuration, and in this case as well, the same effect can be obtained to some different extent.

As illustrated in FIG. 12, in the present example, the bone change part 2B2 of each bone part 2B included in the skeleton part 2 has, as side surfaces, one or a plurality (in the present example, three) of tilted surfaces 2B23, each tilted surface 2B23 is tilted (at a tilt smaller than 90°) relative to the extension direction of the bone change part 2B2, and a width W2 gradually increases as the position moves from the bone constant part 2B1 toward the connection part 2J.

Accordingly, when external force is applied, the bone part 2B is likely to perform buckling deformation at the constricted part in the vicinity of the boundary between the bone constant part 2B1 and the bone change part 2B2, and thus the porous structural body 1 is likely to perform compressed deformation. Accordingly, the surface of the porous structural body 1 provides softer touch.

The extension direction of the bone change part 2B2 is the extension direction of the central axis (skeleton line O) of the bone change part 2B2. The width W2 of each tilted surfaces 2B23 of the bone change part 2B2 is the width of the tilted surfaces 2B23, which is measured along a section orthogonal to the skeleton line O of the bone change part 2B2.

Note that the present disclosure is not limited to the present example, but only some bone parts 2B included in the skeleton part 2 may satisfy the above-described configuration, and in this case as well, the same effect can be obtained to some different extent.

In each example described in the present specification, the cross-sectional shape of each bone part 2B (the bone constant part 2B1 and/or the bone change part 2B2 when the bone part 2B includes the bone constant part 2B1 and the bone change part 2B2) among all or some (preferably, all) of the bone parts 2B included in the skeleton part 2 is preferably a polygon (preferably, a regular polygon) or a circle. In the present example of each drawing, the cross-sectional shapes of the bone constant part 2B1 and the bone change part 2B2 in each bone part 2B included in the skeleton part 2 are regular triangles.

Accordingly, the porous structural body 1 has a simple structure and thus can be easily shaped by a 3D printer. Moreover, machine characteristics of typical poly urethane foam manufactured through the process of foaming by chemical reaction can be easily reproduced. Furthermore, since each bone part 2B has a column shape in this manner, the durability of the porous structural body 1 can be improved as compared to a case in which the bone part 2B is replaced with a thin film part.

Note that the cross-sectional shapes of the bone constant part 2B1 and the bone change part 2B2 are shape at a section orthogonal to the central axis (skeleton line O) of the bone constant part 2B1 and a section orthogonal to the central axis (skeleton line O) of the bone change part 2B2, respectively.

Note that the present disclosure is not limited to the present example, but only some bone parts 2B included in the skeleton part 2 may satisfy the above-described configuration, and in this case as well, the same effect can be obtained to some different extent.

In all or some bone parts 2B included in the skeleton part 2, the cross-sectional shapes of the bone constant part 2B1 and the bone change part 2B2 may be each a polygon (such as a triangle other than a regular triangle, or a rectangle) other than a regular triangle or may be a circle (such as an exact circle or an ellipse), and in this case as well, effects same as those of the present example can be obtained. The cross-sectional shapes of the bone constant part 2B1 and the bone change part 2B2 may be different from each other.

In each example described in the present specification, the ratio (VB×100/VS [%]) of volume VB of the skeleton part 2 relative to volume VS of the porous structural body 1 is preferably 3 to 10%. With the above-described configuration, reaction force that occurs to the porous structural body 1 when external force is applied to the porous structural body 1, in other words, the hardness of the porous structural body 1 is favorable as a cushion member for a passenger seat, particularly as a cushion member used for a car seat pad.

"The volume VS of the porous structural body 1" is the entire volume of an internal space surrounded by the outer edge (outer outline) of the porous structural body 1 (sum of the volume of the skeleton part 2, the volume of a film 3 to be described later when the film 3 is provided, and the volume of a void space).

When the material of the porous structural body 1 is constant, the porous structural body 1 is harder as the ratio of the volume VB of the skeleton part 2 relative to the volume VS of the porous structural body 1 is higher. The porous structural body 1 is softer as the ratio of the volume VB of the skeleton part 2 relative to the volume VS of the porous structural body 1 is lower.

The ratio of the volume VB of the skeleton part 2 relative to the volume VS of the porous structural body 1 is more preferably 4 to 8% to obtain reaction force that occurs to the porous structural body 1 when external force is applied to the porous structural body 1, in other words, the hardness of the porous structural body 1, which is favorable as a cushion member for a passenger seat.

Note that the ratio of the volume VB of the skeleton part 2 relative to the volume VS of the porous structural body 1 may be adjusted by using an optional method, for example, a method of adjusting the thicknesses (cross-sectional areas) of some or all bone parts 2B included in the skeleton part 2 and/or the sizes (cross-sectional areas) of some or all connection parts J included in the skeleton part 2 without changing the dimension of each unit part U of the porous structural body 1.

Figure 14:
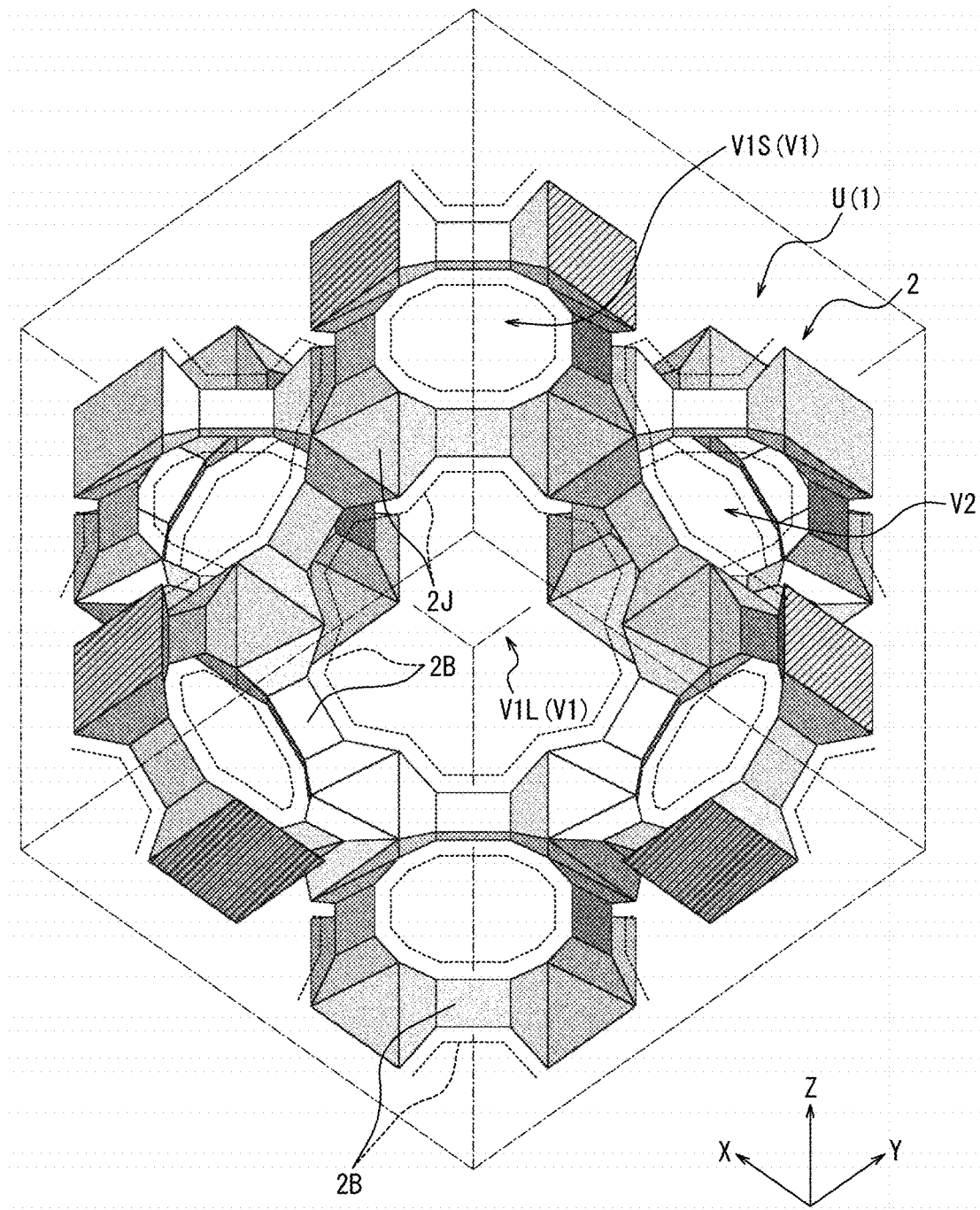
FIG. 14 is a drawing corresponding to FIG. 9, for description of the skeleton part of the porous structural body according to a second modification of the present disclosure.

In a second modification illustrated in FIG. 14 as an exemplary method, the ratio of the volume VB of the skeleton part 2 relative to the volume VS of the porous structural body 1 is increased by increasing, as illustrated with dotted lines, the thickness (cross-sectional area) of each bone part 2B included in the skeleton part 2 and the size (cross-sectional area) of each connection part J included in the skeleton part 2 as compared to those of the porous structural body 1 (example of FIG. 9) illustrated with solid lines.

When the porous structural body 1 is used for a car seat pad, the 25% hardness of the porous structural body 1 is preferably 60 to 500 N, more preferably 100 to 450 N. The 25% hardness of the porous structural body 1 (N) is a measurement value obtained by measuring weight (N) taken for compressing the porous structural body by 25% at 23° C. and the relative humidity of 50% by using an instron compression testing machine.

As illustrated in FIGS. 2 to 5, in the present embodiment, the porous structural body 1 has two kinds of cell holes C, namely, the first cell hole C1 and a second cell hole C2 having a diameter smaller than that of the first cell hole C1. In the present example, each cell hole C (the first cell hole C1 or the second cell hole C2) has a substantially polyhedral shape. More specifically, in the present example, the first cell hole C1 has a substantially Kelvin's tetradecahedral (truncated octahedral) shape. A Kelvin's tetradecahedron (truncated octahedron) is a polyhedron constituted by six square constituent faces and eight regular hexagonal constituent faces. In the present example, the second cell hole C2 has a substantially octahedral shape. However, in the illustrated example, since each bone part 2B includes not only the bone constant part 2B1 but also the bone change parts 2B2 on both sides thereof, the shapes of the first cell hole C1 and the second cell hole C2 are each not a mathematical (complete) Kelvin's tetradecahedron or octahedron. Schematically, the cell holes C included in the porous structural body 1 are regularly arrayed to spatially fill the internal space surrounded by the outer edge (outer outline) of the porous structural body 1 (to reduce each gap (interval) among the cell holes C). Each second cell hole C2 is disposed to fill a small gap (interval) among first cell holes C1. However, in the present example, as understood from FIGS. 5 and 10, in particular, part of each second cell hole C2 is positioned inside a first cell hole C1, in other words, the first cell hole C1 and the second cell hole C2 partially overlap with each other.

When some or all (in the present example, all) cell holes C of the porous structural body 1 have substantially polyhedral shapes as in the present example, each gap (interval) among cell holes C included in the porous structural body 1 is further reduced, and a larger number of cell holes C can be formed inside the porous structural body 1. With this configuration, the behavior of compressing and restoring deformation of the porous structural body 1 in accordance with application and cancellation of external force is more favorable as a cushion member for a passenger seat.

The polyhedron shape of each cell hole C is not limited to the present example but may be optional. For example, a configuration in which each first cell hole C1 has a substantially tetrahedral, substantially octahedral, or substantially dodecahedral shape is preferable to reduce each gap (interval) among cell holes C. Alternatively, the shapes of some or all cell holes C of the porous structural body 1 may be each a stereoscopic shape (for example, a sphere, an ellipsoid, or a cylinder) other than a substantially polyhedral shape. The porous structural body 1 may have only cell holes C of one kind (for example, only the first cell holes C1) or may include cell holes C of three or more kinds. Note that when the shape of each first cell hole C1 is substantially Kelvin's tetradecahedral (truncated octahedral) as in the present example, cushion-member characteristics equivalent to those of typical poly urethane foam manufactured through the process of foaming by chemical reaction can be most easily reproduced as compared to another shape.

In the present example, each first cell hole C1 is constituted by eight unit parts U, two being arrayed in each of the X, Y, and Z directions. Each unit part U serves as parts of a plurality of first cell holes C1. Two second cell holes C2 are disposed for each unit part U.

However, the present disclosure is not limited to the present example, but each cell hole C of the porous structural body 1 may be constituted by an optional number of unit parts U, and each unit part U may be included in an optional number of cell holes C.

As illustrated in FIGS. 2 to 5, in the present example, the skeleton part 2 includes a plurality of first cell defining parts 21 that each define the corresponding first cell hole C1 inside (in the number of first cell holes C1).

As illustrated in FIGS. 2, 3, 6, and 8 to 11, each first cell defining part 21 includes a plurality (in the present example, 14) first annular parts 211. Each first annular part 211 has an annular shape, and an annular inner periphery side edge part 2111 thereof defines a first virtual surface V1 that is flat. The first virtual surface V1 is a virtual plane (in other words, a virtual closed plane) defined by the inner periphery side edge part 2111 of the first annular part 211. The plurality of first annular parts 211 included in each first cell defining part 21 are coupled with each other so that the first virtual surfaces V1 defined by the respective inner periphery side edge parts 2111 thereof do not intersect with each other.

Each first cell hole C1 is defined by the plurality of first annular parts 211 included in the first cell defining part 21, and the plurality of first virtual surfaces V1 defined by the plurality of respective first annular parts 211. Schematically, each first annular part 211 is a part that defines a side of the stereoscopic shape of the first cell hole C1, and each first virtual surface V1 is a part that defines a constituent face of the stereoscopic shape of the first cell hole C1.

Each first annular part 211 is constituted by a plurality of bone parts 2B and a plurality of connection parts 2J connecting the end parts 2Be of the plurality of bone parts 2B.

A coupling portion of each pair of first annular parts 211 coupled with each other is constituted by one bone part 2B and a pair of connection parts 2J at both sides thereof, which are shared by the pair of first annular parts 211.

In the example of each drawing, each first annular part 211 is shared by a pair of first cell defining parts 21 adjacent to the first annular part 211 (in other words, a pair of first cell defining parts 21 sandwiching the first annular part 211 therebetween). In other words, each first annular part 211 serves as parts of a pair of first cell defining parts 21 adjacent to the first annular part 211.

Accordingly, each gap (interval) among first cell holes C1 (that is, a material part of the skeleton part 2 between the first cell holes C1) can be reduced as compared to a case in which each first annular part 211 is not shared by a pair of first cell defining parts 21 adjacent to the first annular part 211 (in other words, a pair of first cell defining parts 21 sandwiching the first annular part 211 therebetween), in other words, the pair of first cell defining parts 21 are formed independently from each other and the first annular parts 211 are formed adjacent to each other or separately from each other or a case in which a rib or the like is interposed between the first annular parts 211, and thus characteristics of the porous structural body 1 as a cushion member (particularly, a seat pad, and more particularly, a car seat pad) can be improved. Accordingly, the porous structural body 1 having a cushioning characteristic can be easily manufactured by a 3D printer.

Note that each first annular part 211 included in the skeleton part 2 preferably satisfies the above-described configuration, but only some first annular parts 211 included in the skeleton part 2 may satisfy the above-described configuration, and in this case as well, the same effect can be obtained to some different extent.

For the same reason, in each example described in the present specification, the skeleton lines O of each pair of first cell defining parts 21 adjacent to each other preferably match each other in a first annular part 211 shared by the pair of first cell defining parts 21.

In the example of each drawing, a surface of the first virtual surface V1 (front surface of the first virtual surface V1) on one side defines part of a first cell hole C1, and a surface of the first virtual surface V1 (back surface of the first virtual surface V1) on the other side defines part of another first cell hole C1.

In other words, the front and back surfaces of each first virtual surface V1 define parts of first cell holes C1 different from each other. In other words, each first virtual surface V1 is shared by a pair of first cell holes C1 adjacent to the first virtual surface V1 (in other words, a pair of first cell holes C1 sandwiching the first virtual surface V1 therebetween).

Accordingly, each gap (interval) among first cell holes C1 can be reduced as compared to a case in which each first virtual surface V1 is not shared by a pair of first cell holes C1 adjacent to the first virtual surface V1 (in other words, a pair of first cell holes C1 sandwiching the first virtual surface V1 therebetween), in other words, the first virtual surfaces V1 of the pair of first cell holes C1 are separated from each other, and thus the cushion-member characteristics of the porous structural body 1 can be improved.

Note that each first virtual surface V1 included in the skeleton part 2 preferably satisfies the above-described configuration, but only some first virtual surfaces V1 included in the skeleton part 2 may satisfy the above-described configuration, and in this case as well, the same effect can be obtained to some different extent.

In each example described in the present specification, as in the example of each drawing, the skeleton line O of each first annular part 211 shared by a pair of first cell defining parts 21 adjacent to each other is preferably continuous with the skeleton lines O of the pair of first cell defining parts 21 at parts adjacent to the shared first annular part 211 (see FIGS. 1, 7, or the like).

With this configuration, the cushion-member characteristics of the porous structural body are more favorable.

For the same reason, in each example described in the present specification, as in the example of each drawing, the skeleton lines O of each pair of first cell defining parts 21 adjacent to each other are preferably match each other in a first annular part 211 shared by the pair of first cell defining parts 21.

In addition, for the same reason, in each example described in the present specification, as in the example of each drawing, the cross-sectional area (for example, the cross-sectional area of the bone constant part 2B1) of each bone part 2B included in a first annular part 211 shared by each pair of first cell defining parts 21 adjacent to each other is preferably same as the cross-sectional area (for example, the cross-sectional area of the bone constant part 2B1) of each bone part 2B included in part of each first cell defining part 21, which is adjacent to the shared first annular part 211.

Note that all first annular parts 211 each shared by a pair of first cell defining parts 21 adjacent to each other in the skeleton part 2 preferably satisfy the above-described configuration, but only some first annular parts 211 each shared by a pair of first cell defining parts 21 adjacent to each other in the skeleton part 2 may satisfy the above-described configuration, and in this case as well, the same effect can be obtained to some different extent.

In the present example, each first virtual surface V1 is not covered with a film but is opened, in other words, has an opening. Thus, cell holes C are communicated with each other through the first virtual surface V1 to allow ventilation between the cell holes C. Accordingly, the breathability of the porous structural body 1 is improved, and compressing and restoring deformation of the porous structural body 1 in accordance with application and cancellation of external force can be easily performed.

As illustrated in FIGS. 2, 3, and 6 to 11, in the present example, the plurality (in the present example, 14) first annular parts 211 included in each first cell defining part 21 each include one or a plurality (in the present example, six) of first small annular parts 211S and one or a plurality (in the present example, eight) of first large annular parts 211L. The annular inner periphery side edge part 2111 of each first small annular part 211S defines a first small virtual surface V1S that is flat. The annular inner periphery side edge part 2111 of each first large annular part 211L defines a first large virtual surface V1L that is flat and has an area larger than that of the first small virtual surface V1S. The first small virtual surface V1S and the first large virtual surface V1L are each a virtual plane (in other words, a virtual closed plane).

FIGS. 8 and 10 illustrate the skeleton line O of part of each unit part U, which serves as a first cell defining part 21. As understood from FIGS. 8 and 10, in the present example, the skeleton line O of each first large annular part 211L has a regular hexagonal shape, and accordingly, the corresponding first large virtual surface V1L substantially has a regular hexagonal shape. In the present example, the skeleton line O of each first small annular part 211S has a square shape, and accordingly, the corresponding first small virtual surface V1S substantially has a square shape. In this manner, in the present example, the first small virtual surface V1S and the first large virtual surface V1L are different from each other not only in area but also in shape.

Each first large annular part 211L is constituted by a plurality (in the present example, six) of bone parts 2B and a plurality (in the present example, six) of connection parts 2J connecting the end parts 2Be of the plurality of bone parts 2B. Each first small annular part 211S is constituted by a plurality (in the present example, four) of bone parts 2B and a plurality (in the present example, four) of connection parts 2J connecting the end parts 2Be of the plurality of bone parts 2B.

Since the plurality of first annular parts 211 included in the first cell defining part 21 include the first small annular part 211S and the first large annular part 211L having different sizes, each gap (interval) among first cell holes C1 included in the porous structural body 1 can be further reduced. Moreover, when the shapes of the first small annular part 211S and the first large annular part 211L are different from each other as in the present example, each gap (interval) among first cell holes C1 included in the porous structural body 1 can be further reduced.

However, the plurality of first annular parts 211 included in the first cell defining part 21 may have the same size and/or shape. When the first annular parts 211 included in each first cell defining part 21 have the same size and shape, the same machine characteristics can be obtained in the X, Y, and Z directions.

When some or all (in the present example, all) first virtual surfaces V1 included in the first cell defining part 21 have substantially polygonal shapes as in the present example, the interval among cell holes C included in the porous structural body 1 can be further reduced. Moreover, the behavior of compressing and restoring deformation of the porous structural body 1 in accordance with application and cancellation of external force is more favorable as a cushion member for a passenger seat. Furthermore, since the shape of each first virtual surface V1 is simple, manufacturability and characteristic adjustment easiness can be improved. Note that the same effect can be obtained to some different extent when at least one first virtual surface V1 included in the porous structural body 1 satisfies the above-described configuration.

Note that at least one first virtual surface V1 included in the porous structural body 1 may have an optional substantially polygonal shape other than a substantially regular hexagonal shape and a substantially square shape as in the present example or have a planar shape (for example, a circle (such as an exact circle or an ellipse)) other than a substantially polygonal shape. When the shape of each first virtual surface V1 is a circle (such as an exact circle, or an ellipse), the shape of each first virtual surface V1 is simple and thus manufacturability and characteristic adjustment easiness can be improved, and more homogenous machine characteristics can be obtained. For example, when the shape of each first virtual surface V1 is an ellipse (horizontally long ellipse) that is long in a direction substantially orthogonal to the direction of weight application, the first annular part 211 that defines the first virtual surface V1, that is, the porous structural body 1 easily deforms (is soft) in response to weight input as compared to a case in which the shape of the first virtual surface V1 is an ellipse (vertically long ellipse) that is long in a direction substantially parallel to the direction of weight application.

As illustrated in FIGS. 2 to 5, in the present example, the skeleton part 2 includes a plurality of second cell defining parts 22 (in the number of second cell holes C2) that each define a second cell hole C2 inside.

As illustrated in FIGS. 2, 3 and 6 to 11 (FIG. 7, in particular), each second cell defining part 22 includes a plurality (in the present example, two) of second annular parts 222. Each second annular part 222 has an annular shape, and an annular inner periphery side edge part 2221 thereof defines a second virtual surface V2 that is flat. The second virtual surface V2 is a virtual plane (in other words, a virtual closed plane) defined by the inner periphery side edge part 2221 of the second annular part 222. The second annular parts 222 included in the second cell defining part 22 are coupled with each other so that the second virtual surfaces V2 defined by the respective inner periphery side edge parts 2221 intersect with (in the present example, are orthogonal to) each other.

Each second cell hole C2 is defined by the inner periphery side edge parts 2221 of the respective second annular parts included in the corresponding second cell defining part 22 and by virtual surfaces smoothly coupling the inner periphery side edge parts 2221.

FIG. 7 illustrates the skeleton line O of part of each unit part U, which serves as a second cell defining part 22. As understood from FIG. 7, in the present example, the skeleton line O of each second annular part 222 included in the second cell defining part 22 has a square shape, and accordingly, the corresponding second virtual surface V2 has a substantially square shape.

Each second annular part 222 is constituted by a plurality (in the present example, four) of bone parts 2B, and a plurality (in the present example, four) of connection parts 2J connecting the end parts 2Be of the plurality of bone parts 2B.

In the present example, each coupling portion of second annular parts 222 included in each second cell defining part 22 is constituted by two connection parts J shared by the second annular parts 222.

In the present example, the second virtual surfaces V2 included in each second cell defining part 22 have the same shape and area.

Note that the shape of each second virtual surface V2 included in each second cell defining part 22 is not limited to the present example but may be an optional substantially polygonal shape other than a substantial square or have a planar shape (for example, a circle (such as an exact circle, or an ellipse)) other than a substantially polygonal shape. When the shape of each second virtual surface V2 is a substantially polygonal shape or a circle (such as an exact circle, or an ellipse), the shape of the second virtual surface V2 is simple, and thus manufacturability and characteristic adjustment easiness can be improved. For example, when the shape of each second virtual surface V2 is an ellipse (horizontally long ellipse) that is long in a direction substantially orthogonal to the direction of weight application, the second annular part 222 that defines the second virtual surface V2, that is, the porous structural body 1 easily deforms (is soft) in response to weight input as compared to a case in which the shape of the second virtual surface V2 is an ellipse (vertically long ellipse) that is long in a direction substantially parallel to the direction of weight application.

As illustrated in FIGS. 7 and 10, in the present example, one of the two second annular parts 222 included in each second cell defining part 22 also serves as a first annular part 211 (more specifically, first small annular part 211S).

In the present example, each second virtual surface V2 is not covered with a film but is opened, in other words, has an opening. Thus, cell holes C (in particular, a first cell hole C1 and a second cell hole C2) are communicated with each other through the second virtual surface V2 to allow ventilation between the cell holes C. Accordingly, the breathability of the porous structural body 1 can be improved, and compressing and restoring deformation of the porous structural body 1 in accordance with application and cancellation of external force can be easily performed.

As illustrated in FIGS. 1 to 3, the top skin part 6 of the porous structural body 1 of the present embodiment is integrated with the skeleton part 2. The top skin part 6 is formed on at least part of the outer side of the skeleton part 2 to block at least some of the plurality of cell holes C. In the present embodiment, the top skin part 6 has a surface that is integrated with a part or whole of an outermost part of the skeleton part 2 and continuous to block some or all cell holes C. At least part of the outer side of the top skin part 6 is a surface. The "surface" is, for example, a schematically smoothly continuous surface and may be a smooth surface without irregularities or a surface with irregularities. However, when the surface has irregularities, the surface has surface roughness that allows shaping by using a 3D printer, for example, such surface roughness that the dimensions (such as height, depth, width, and diameter) of convex and concave parts of irregularities in each direction are equal to or larger than 0.1 mm, and the height of each convex part of irregularities (in other words, the depth of each concave part) is equal to or smaller than 2 mm.

When the stereoscopic shape of the porous structural body 1 is a rectangular parallelepiped as described above, the porous structural body 1 has a top surface 110, a bottom surface 120, and a side surface 130, and the surface of the top skin part 6 is included in at least one of the top surface 110, the bottom surface 120, and the side surface 130.

Specifically, the top skin part 6 may include a top-surface-side top skin part 61, a bottom-surface-side top skin part 62, and a side-surface-side top skin part 63.

The top-surface-side top skin part 61 has a surface serving as a top surface 11 of the porous structural body 1. The bottom-surface-side top skin part 62 has a surface serving as a bottom surface 102 of the porous structural body 1. The side-surface-side top skin part 63 serves as the side surface 13 of the porous structural body 1.

Since the top skin part 6 is formed at least part of the outer side of the skeleton part 2 to block at least some of the plurality of cell holes C in this manner, another member can be bonded to the surface as which the top skin part 6 serves when the porous structural body 1 is bonded to the other member. Accordingly, the porous structural body 1 is bonded to the other member through large area as compared to a case in which the other member is bonded at the outer side of the skeleton part 2, and thus improved adhesiveness can be obtained.

The surface of the top skin part 6 is continuously formed from the top surface 110 to each side surface 130 included in the porous structural body 1. The surface of the top skin part 6 is continuously formed from the bottom surface to each side surface included in the porous structural body 1.

Specifically, as illustrated in FIG. 1, the top-surface-side top skin part 61 and each side-surface-side top skin part 63 are continuous with each other so that the surfaces thereof are continuous with each other. Similarly, the bottom-surface-side top skin part 62 and each side-surface-side top skin part 63 are continuous with each other so that the surfaces thereof are continuous with each other. Two side-surface-side top skin parts 63 having surfaces orthogonal to each other are continuous with each other so that the surfaces thereof are continuous with each other.

The surface of the top skin part 6 is continuously formed from the top surface 110 to each side surface 130 and continuously formed from the bottom surface to each side surface in this manner and thus is not discontinuous at an end part of any of the top surface, each side surface, and the bottom surface, and improved adhesiveness with another member can be obtained at the end part as well.

As illustrated in FIGS. 1 to 3, the top skin part 6 includes a smooth part 6A at which the surface thereof is formed, and a through hole 6B defined by the smooth part 6A and penetrating through the top skin part 6. Specifically, the top-surface-side top skin part 61, the bottom-surface-side top skin part 62, and each side-surface-side top skin part 63 of the top skin part 6 each include the smooth part 6A and the through hole 6B.

The ratio of the total area of the surface relative to the surface area of the top skin part 6 is preferably equal to or higher than 8%. The surface area of the top skin part 6 is the sum of the total area of the surface and the total opening area of each through hole 6B.

When the ratio of the total area of the surface relative to the surface area of the top skin part 6 is equal to or higher than 8%, it is possible to obtain improved adhesiveness when the porous structural body 1 is bonded by adhesive applied to the surface. In addition, pressing force received by the smooth part 6A when the porous structural body 1 is pressed is larger. Thus, reduced part of the skeleton part 2 directly receives impact, and the skeleton part 2 is less likely to be damaged. Accordingly, the durability of the porous structural body 1 increases. However, the ratio of the total area of the surface relative to the surface area of the top skin part 6 may be lower than 8%. In this case, the breathability between the outer and inner sides of the top skin part 6 in the porous structural body 1 increases.

For example, the ratio of the surface area of the smooth part 6A relative to the surface area of the top skin part 6 at part of the top-surface-side top skin part 61, the bottom-surface-side top skin part 62, and each side-surface-side top skin part 63, which faces a seated person can be smaller than that at part thereof not facing the seated person to increase the breathability so that the seated person can comfortably sit. In addition, when the porous structural body 1 is used in an environment in which the porous structural body 1 is likely to receive external force, the ratio of the surface area of the smooth part 6A relative to the surface area of the top skin part 6 in a region expected to be likely to receive external force can be larger than that at another part to increase the durability.

In the present embodiment, each through hole 6B has a circular or oval (in the present embodiment, circular) opening shape at the outer surface in surface view in a direction facing the surface of the top skin part 6. However, each through hole 6B is not limited to a circular or oval shape in surface view but may have a rectangular shape or any other shape. The top skin part 6 includes the plurality of through holes 6B, and the plurality of through holes 6B are arrayed in a lattice shape so that the surface of the top skin part 6 is continuous in a lattice shape in surface view.

In the present embodiment, the porous structural body 1 has at least one cell hole C having a diameter of 5 mm or larger. Accordingly, the porous structural body 1 can be easily manufactured by using a 3D printer. When the diameter of each cell hole C of the porous structural body 1 is smaller than 5 mm, the structure of the porous structural body 1 is potentially too complicated so that it is difficult to generate, on a computer, three-dimensional shape data (such as CAD data) representing the three-dimensional shape of the porous structural body 1 or 3D shaping data generated based on the three-dimensional shape data.

Note that since a conventional porous structural body having a cushioning characteristic is manufactured through the process of foaming by chemical reaction as described above, it has been not easy to form a cell hole C having a diameter of 5 mm or larger. However, the applicant of the present disclosure has newly found that cushion-member characteristics equivalent to conventional cushion-member characteristics can be obtained even when a porous structural body includes a cell hole C having a diameter of 5 mm or larger. Since the porous structural body includes a cell hole C having a diameter of 5 mm or larger, the porous structural body can be easily manufactured by a 3D printer.

In addition, since the porous structural body 1 includes a cell hole C having a diameter of 5 mm or larger, the breathability of the porous structural body 1 and deformation easiness can be easily improved.

As the diameter of each cell hole C increases, the porous structural body 1 can be more easily manufactured by using a 3D printer and the breathability and deformation easiness can be more easily improved. For this reason, the diameter of at least one cell hole C in the porous structural body 1 is preferably 8 mm or larger, more preferably 10 mm or larger.

However, when each cell hole C in the porous structural body 1 is too large, it is difficult to cleanly (smoothly) form the outer edge (outer outline) shape of the porous structural body 1, which potentially leads to decreased shaping accuracy and degraded appearance. In addition, the cushion-member characteristics are potentially not sufficiently favorable. Thus, to improve the appearance and cushion-member characteristics, the diameter of each cell hole C in the porous structural body 1 is preferably 30 mm or smaller, more preferably 25 mm or smaller, further more preferably 20 mm or smaller.

Note that each above-described effect is more likely to be obtained as the porous structural body 1 includes a larger number of cell holes C satisfying any above-described diameter numerical range. For this reason, at least the diameter of each first cell hole C1 among the plurality of cell holes C included in the porous structural body 1 preferably satisfies at least one above-described numerical range. The diameter of each cell hole C (first cell hole C1 or second cell hole C2) included in the porous structural body 1 more preferably satisfies at least one above-described numerical range. Similarly, the average diameter of each cell hole C (first cell hole C1 or second cell hole C2) included in the porous structural body 1 more preferably satisfies at least one above-described numerical range.

Note that the diameter of each cell hole C is the diameter of a circumscribed sphere of the cell hole C when the cell hole C has a shape different from a rigorous spherical shape as in the present example.

When each cell hole C in the porous structural body 1 is too small, it is difficult to manufacture the porous structural body 1 by using a 3D printer. To facilitate manufacturing of the porous structural body 1 by using a 3D printer, the diameter of a cell hole C (in the present example, second cell hole C2) included in the porous structural body 1 and having a minimum diameter is preferably 0.05 mm or larger, more preferably 0.10 mm or larger. Shaping can be performed at the resolution of a 3D printer of high performance when the diameter of a cell hole C (in the present example, second cell hole C2) having a minimum diameter is 0.05 mm or larger, and shaping can be performed not only at the resolution of a 3D printer of high performance but also at the resolution of a general-purpose 3D printer when the diameter is 0.10 mm or larger.

Figure 15:
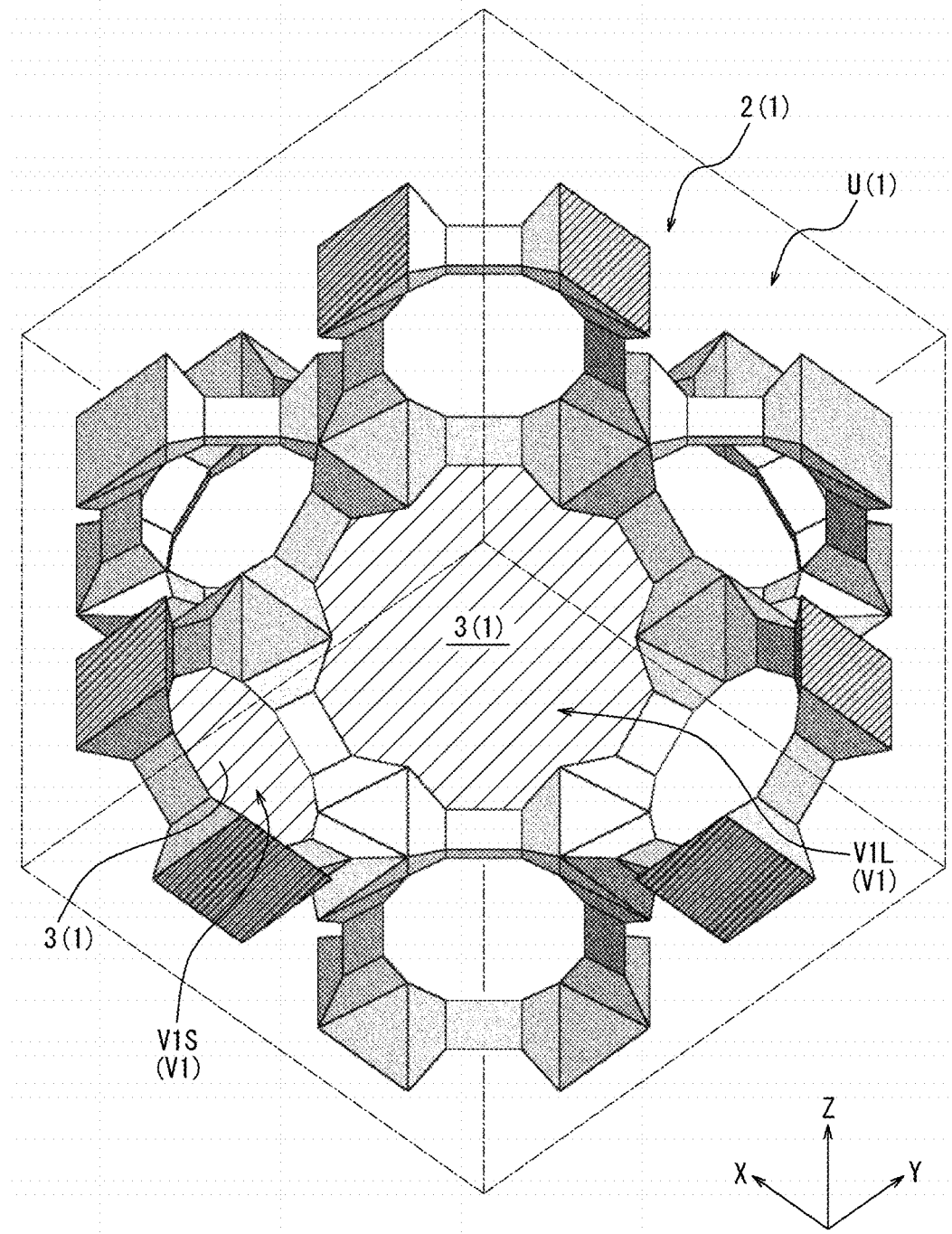
FIG. 15 is a drawing corresponding to FIG. 9, the skeleton part of the porous structural body according to a third modification of the present disclosure.

As in a third modification illustrated in FIG. 15, at least one first virtual surface V1 included in the porous structural body 1 may be covered with the film 3. The film 3 is made of a material same as that of the skeleton part 2 and integrated with the skeleton part 2. The film 3 prevents communication between two first cell holes C1 sandwiching the first virtual surface V1 therebetween, and accordingly, the breathability of the porous structural body 1 as a whole degrades. The breathability of the porous structural body 1 as a whole can be adjusted by adjusting the number of first virtual surfaces V1 included in the porous structural body 1 and covered with the film 3, and various breathability levels can be achieved in accordance with a request. For example, when the porous structural body 1 is used for a car seat pad, the performance of an in-vehicle air conditioner, anti-stuffiness, and ride comfort can be increased by adjusting the breathability of the porous structural body 1. To increase the performance of an in-vehicle air conditioner, anti-stuffiness, and ride comfort when the porous structural body 1 is used for a car seat pad, it is not preferable that all first virtual surfaces V1 included in the porous structural body 1 are covered with the film 3, in other words, it is preferable that at least one first virtual surface V1 included in the porous structural body 1 is not covered with the film 3 but is opened.

To increase the performance of an in-vehicle air conditioner, anti-stuffiness, and ride comfort when the porous structural body 1 is used for a car seat pad, the breathability of the porous structural body 1 is preferably 100 to 700 cc/cm$^2$/sec, more preferably 150 to 650 cc/cm$^2$/sec, further more preferably 200 to 600 cc/cm$^2$/sec. The breathability (cc/cm$^2$/sec) of the porous structural body 1 is measured in accordance with JIS K 6400-7. When the porous structural body 1 is used for a car seat pad, the resonance magnification of the porous structural body 1 is preferably equal to or larger than three and smaller than eight, more preferably equal three to five inclusive. The density of the porous structural body 1 is preferably, for example, 20 to 100 kg/m$^3$.

Note that since a conventional porous structural body has been manufactured through the process of foaming by chemical reaction as described above, it has been difficult to form, at desired positions, a desired number of films for communication holes through which cells are communicated. When the porous structural body 1 is manufactured by a 3D printer as in the present example, information of the film 3 is included in advance in 3D shaping data to be read by the 3D printer, and thus a desired number of films 3 can be reliably formed at desired positions.

For the same reason, at least one first small virtual surface V1S included in the porous structural body 1 may be covered with the film 3. In addition or alternatively, at least one first large virtual surface V1L included in the porous structural body 1 may be covered with the film 3.

Figure 16:
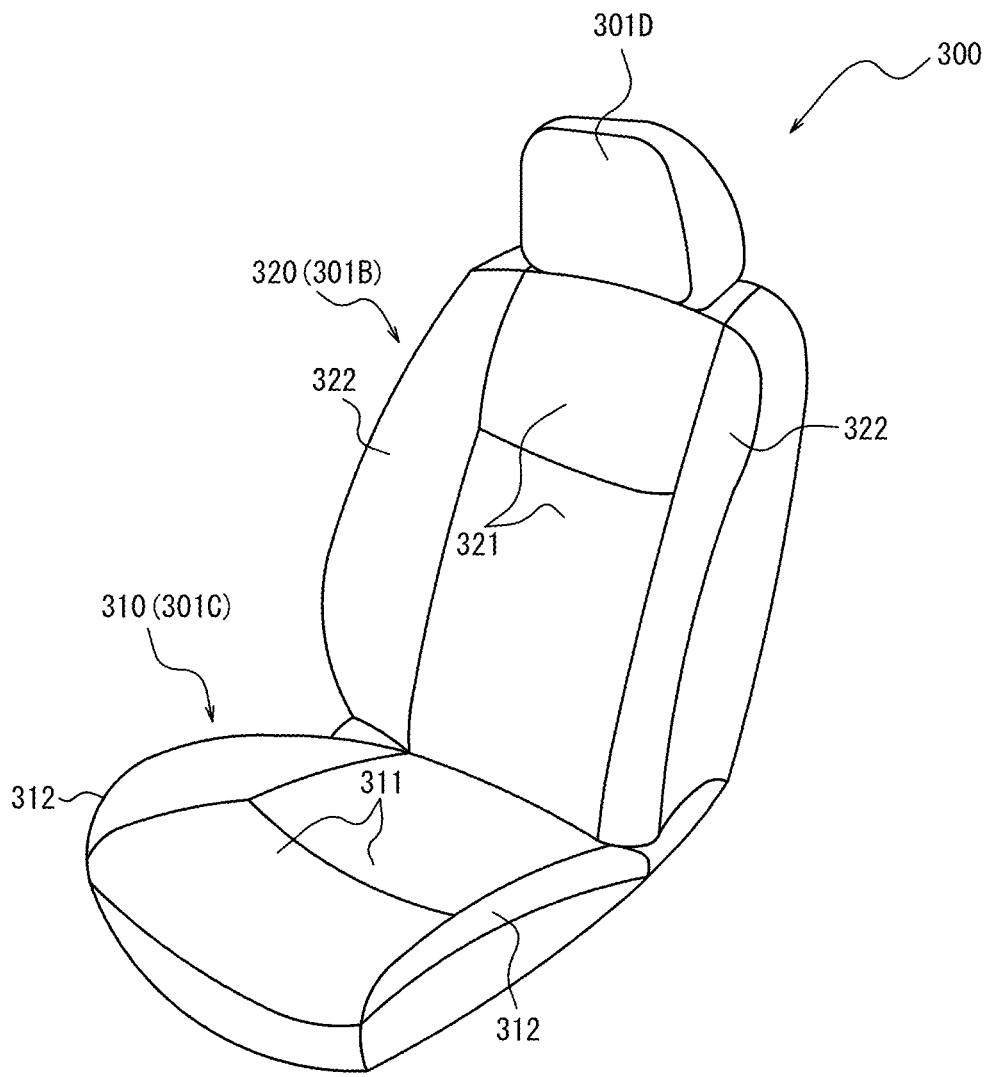
FIG. 16 is a perspective view illustrating a passenger-seat cushion member including the porous structural body according to an embodiment of the present disclosure.

Subsequently, a passenger-seat cushion member 300 will be described below with reference to FIG. 16. FIG. 16 is a perspective view schematically illustrating the passenger-seat cushion member 300 according to the present embodiment. The passenger-seat cushion member 300 in FIG. 16 may be a passenger-seat cushion member of an optional kind and is preferably, for example, a vehicle-seat cushion member, more preferably a car seat pad.

The passenger-seat cushion member 300 includes a seat-cushion cushion member 301C on which a seated person sits, a seat-back cushion member 301B for supporting the back of the seated person, and a head-rest cushion member 301D. In the example of FIG. 16, the head-rest cushion member 301D is separated from the seat-back cushion member 301B but may be integrated with the seat-back cushion member 301B.

In the present specification, as denoted in FIG. 16, "up", "down", "left", "right", "front", and "back" directions when viewed from the seated person sitting on the passenger-seat cushion member 300 are simply referred to as, for example, "up", "down", "left", "right", "front", and "back", respectively.

The seat-cushion cushion member 301C includes a cushion pad 310 formed of the porous structural body 1. The cushion pad 310 includes a main pad 311 on which the hip region and the femoral region of the seated person sit, and a pair of side pads 312 positioned on right and left both sides of the main pad 311 and protruding beyond the main pad 311 to support the seated person from the right and left both sides.

The seat-back cushion member 301B includes a back pad 320 formed of the porous structural body 1. The back pad 320 includes a main pad 321 formed to support the back of the seated person from the back side, and a pair of side pads 322 positioned on the right and left both sides of the main pad 321 and protruding on the front side of the main pad 321 to support the seated person from the right and left both sides.

Figure 17:
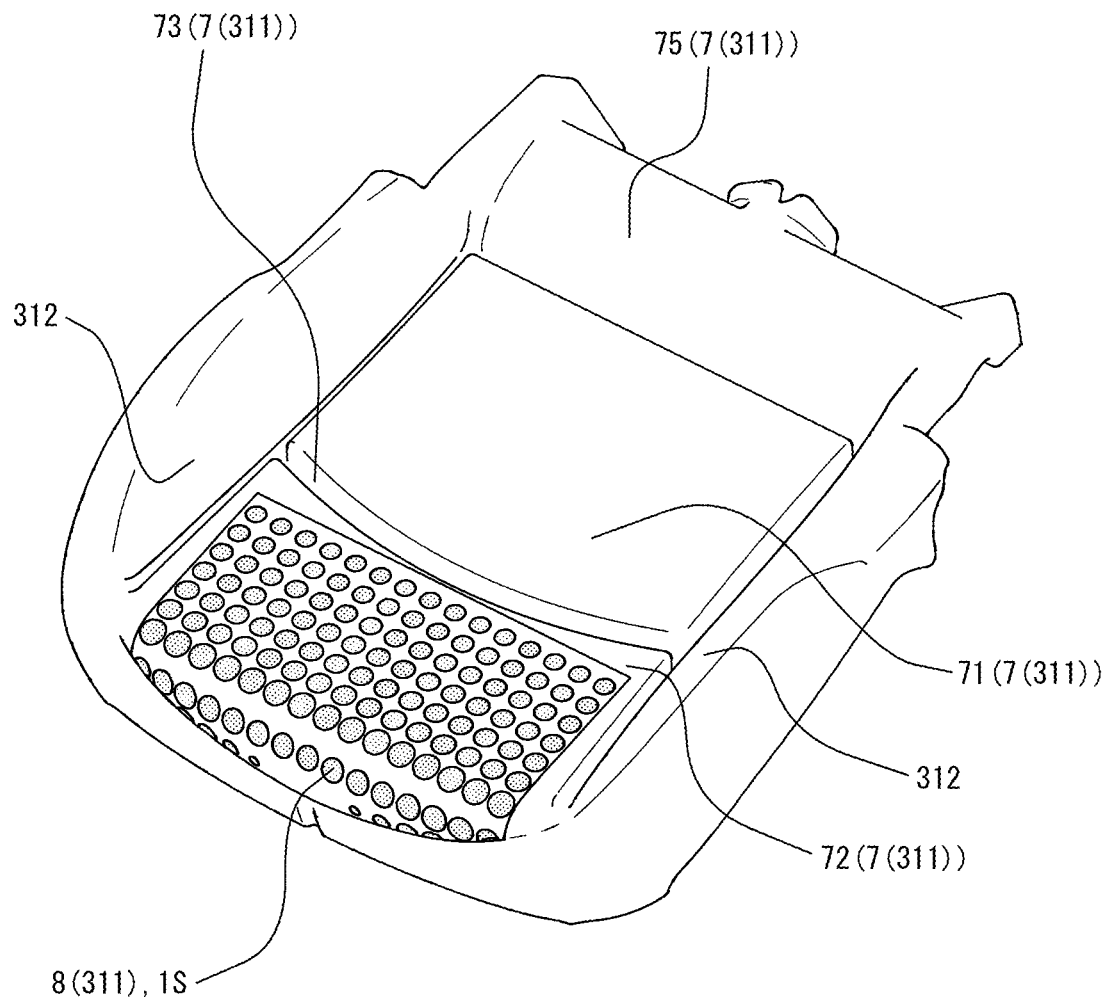
FIG. 17 is a perspective view illustrating details of a main pad and side pads in the passenger-seat cushion member in FIG. 16.

An example of the main pad 311 will be described in detail below. As illustrated in FIG. 17, the main pad 311 includes a seat body 7, and a filling body 8 that fills a hole part 74 formed in the seat body 7, which will be described later.

First, an example of the seat body 7 will be described in detail below with reference to FIGS. 17 to 21.

Figure 20:
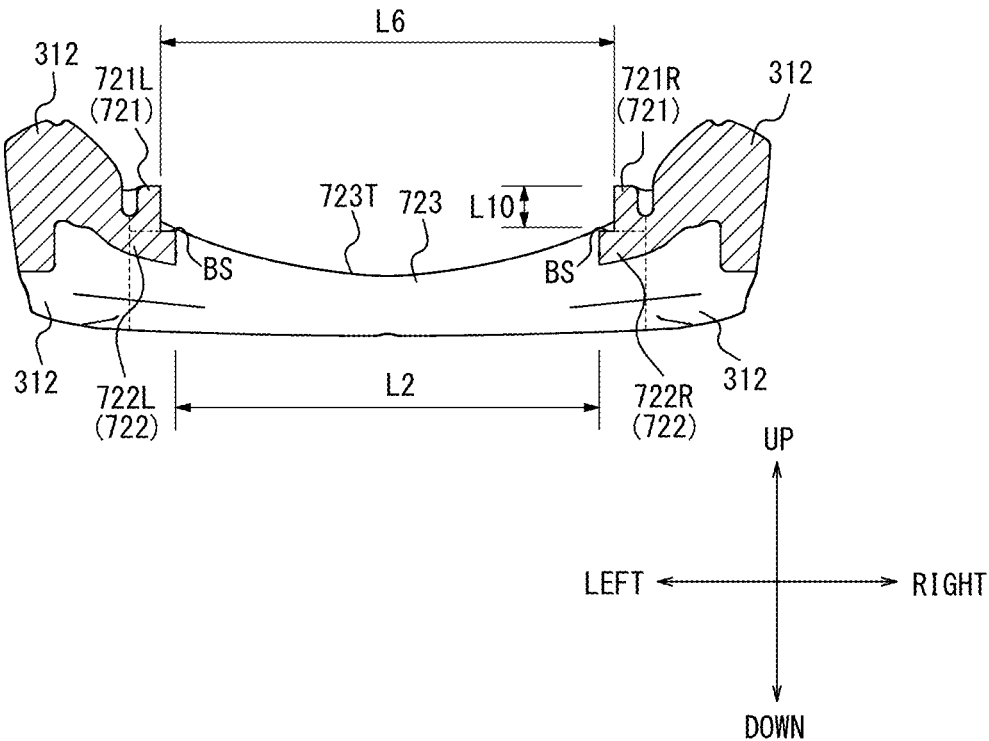
FIG. 20 is an A-A cross-sectional view of the seat body in FIG. 18.
Figure 21:
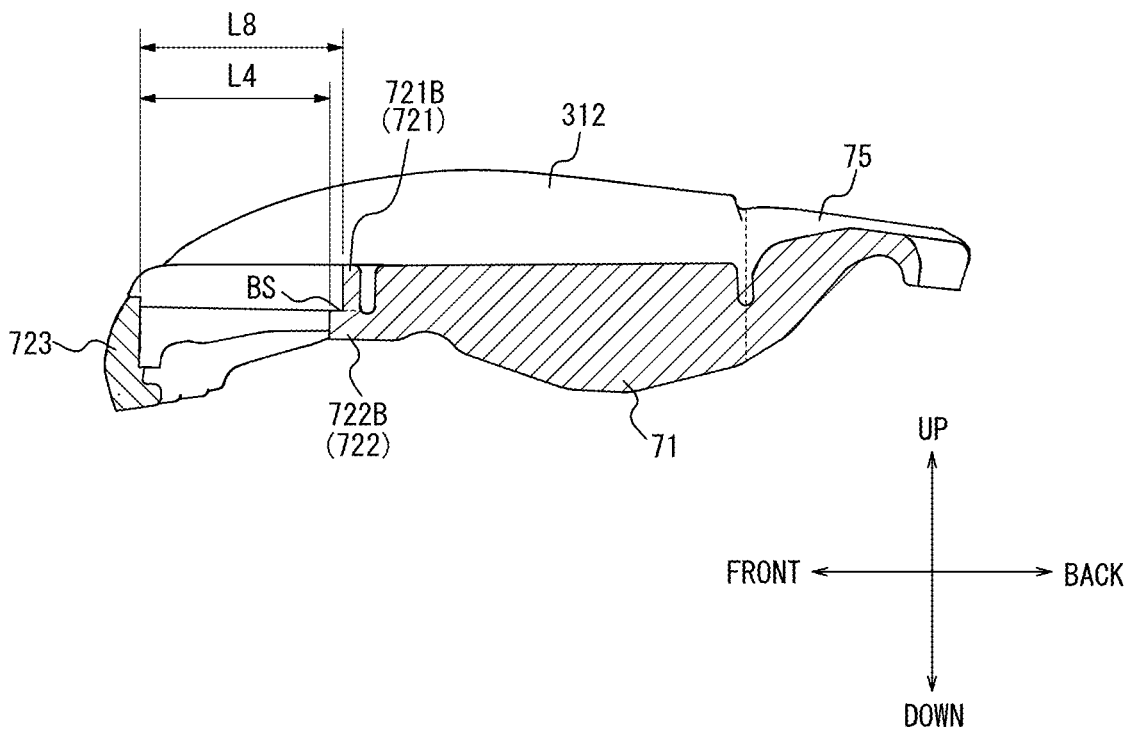
FIG. 21 is a B-B cross-sectional view of the seat body in FIG. 18.

FIG. 17 is a perspective view illustrating details of the main pad 311 and the side pads 312. FIG. 18 is a perspective view illustrating the seat body of the main pad in FIG. 17. FIG. 19 is a top view illustrating the seat body 7 in FIG. 18. FIG. 20 is an A-A cross-sectional view of the seat body 7 in FIG. 18. FIG. 21 is a B-B cross-sectional view of the seat body 7 in FIG. 18.

As illustrated in FIG. 18, the seat body 7 includes an under-hip portion 71, a femoral circumferential periphery-placed part 72, a groove part 73, the hole part 74, and a back-pad coupling part 75. The under-hip portion 71, the femoral circumferential periphery-placed part 72, the back-pad coupling part 75 are formed of a porous structural body 1B for the seat body 7.

The under-hip portion 71 has a substantially flat surface facing in the up direction. In top view in which a surface on which the seated person sits is viewed from the seated person side as illustrated in FIG. 19, the under-hip portion 71 has a shape, the circumferential periphery of which is formed by three straight lines positioned on the back side, the left side, and the right side, and one gentle forwardly convex arc-shaped curve positioned on the front side.

The femoral circumferential periphery-placed part 72 is disposed on the front side of the front-side curve serving as the circumferential periphery of the under-hip portion 71. The femoral circumferential periphery-placed part 72 defines the hole part 74 having a substantially rectangular shape and extending in the up-down direction inside the femoral circumferential periphery-placed part 72. The hole part 74 may penetrate through the seat body 7 in the up-down direction as illustrated in FIG. 19 or may have a concave shape having a bottom surface on the upper or lower side.

The femoral circumferential periphery-placed part 72 has a shape, the circumferential periphery of which is formed by two straight lines positioned on the left and right sides and facing each other and by gentle arc-shaped curves positioned on the back and front sides. The gentle arc-shaped curve positioned on the back side in the femoral circumferential periphery-placed part 72 is positioned at a constant interval along the curve serving as the circumferential periphery of the under-hip portion 71.

As illustrated in FIGS. 19 and 20, the femoral circumferential periphery-placed part 72 includes an upper femoral circumferential periphery-placed part (first femoral circumferential periphery-placed part) 721, a lower femoral circumferential periphery-placed part (second femoral circumferential periphery-placed part) 722, and a front femoral circumferential periphery-placed part (third femoral circumferential periphery-placed part) 723. The upper femoral circumferential periphery-placed part 721, the lower femoral circumferential periphery-placed part 722, and the front femoral circumferential periphery-placed part 723 are integrated with one another. The upper femoral circumferential periphery-placed part 721, the lower femoral circumferential periphery-placed part 722, and the front femoral circumferential periphery-placed part 723 are also integrated with the side pads 312.

The upper femoral circumferential periphery-placed part 721 and the lower femoral circumferential periphery-placed part 722 are positioned on the right, left, and back sides of the femoral circumferential periphery-placed part 72. The lower femoral circumferential periphery-placed part 722 is positioned on the lower side of the upper femoral circumferential periphery-placed part 721 and protrudes on the inner side of the upper femoral circumferential periphery-placed part 721. Specifically, as illustrated in FIG. 20, a left side 722L of the lower femoral circumferential periphery-placed part 722 protrudes on the right side of a left side 721L of the upper femoral circumferential periphery-placed part 721, and a right side 722R of the lower femoral circumferential periphery-placed part 722 protrudes on the left side of a right side 721R of the upper femoral circumferential periphery-placed part 721. As illustrated in FIG. 21, a back side 722B of the lower femoral circumferential periphery-placed part 722 protrudes on the front side of a back side 721B of the upper femoral circumferential periphery-placed part 721. Accordingly, a body stepping surface BS that is a surface of a step in the up direction and continuous with the inner side surface of the upper femoral circumferential periphery-placed part 721 is formed at the lower femoral circumferential periphery-placed part 722.

As illustrated in FIG. 19, the front femoral circumferential periphery-placed part 723 is positioned on the front side in the entire femoral circumferential periphery-placed part 72. As illustrated in FIG. 20, an upper end part 723T of the front femoral circumferential periphery-placed part 723 is positioned lowest in the vicinity of the center in the right-left direction and positioned higher as the position moves toward end parts in the right-left direction.

As illustrated in FIGS. 18 and 19, the groove part 73 is a groove defined by a back-side curve serving as the circumferential periphery of the femoral circumferential periphery-placed part 72 and the curve serving as the circumferential periphery of the under-hip portion 71. The groove part 73 can house a seam allowance of a cover over the cushion member 300.

The back-pad coupling part 75 is coupled with the under-hip portion 71 and can be coupled with the back pad 320.

Figure 23:
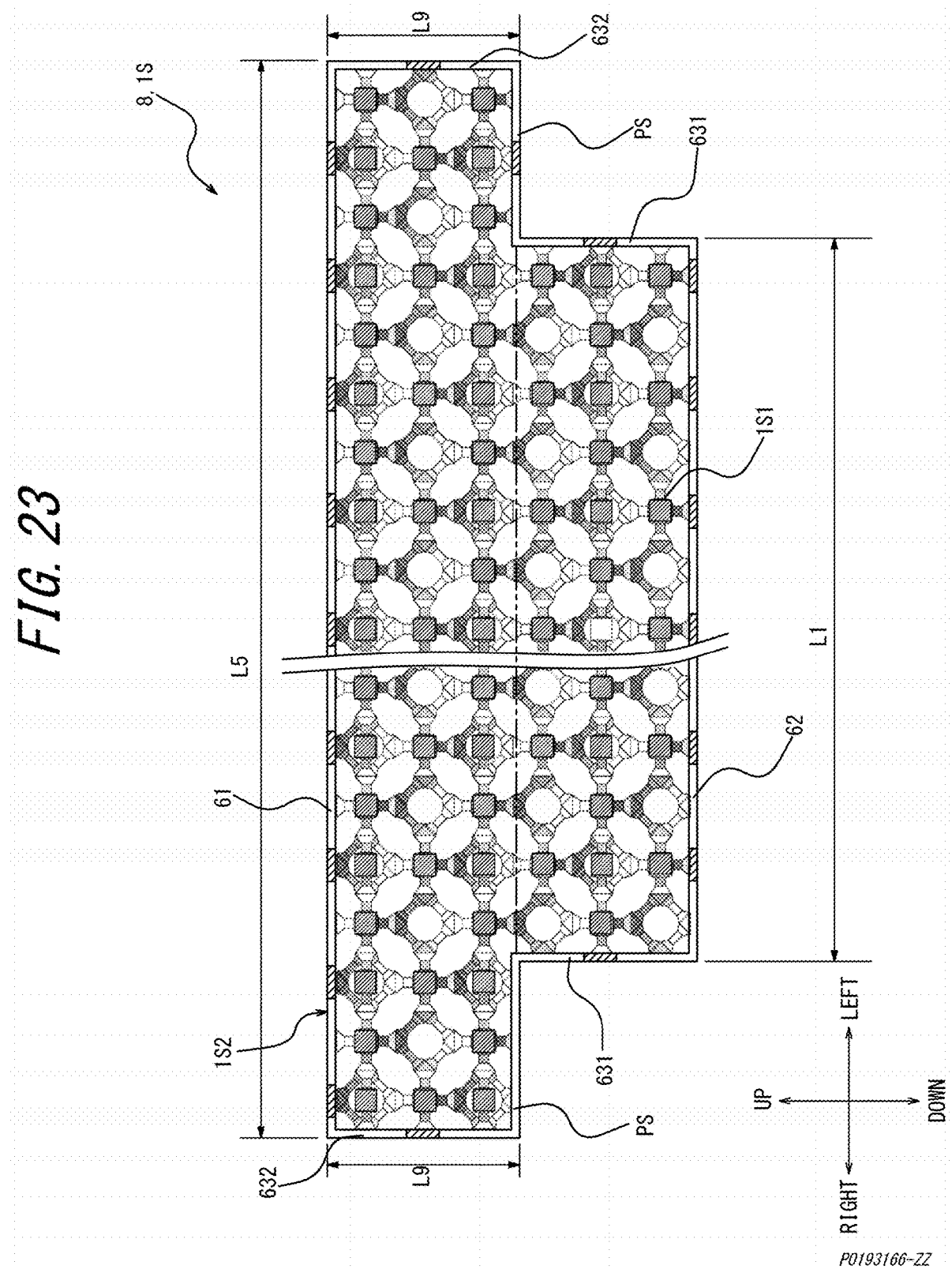
FIG. 23 is a C-C cross-sectional view of the porous structural body in FIG. 22.
Figure 24:
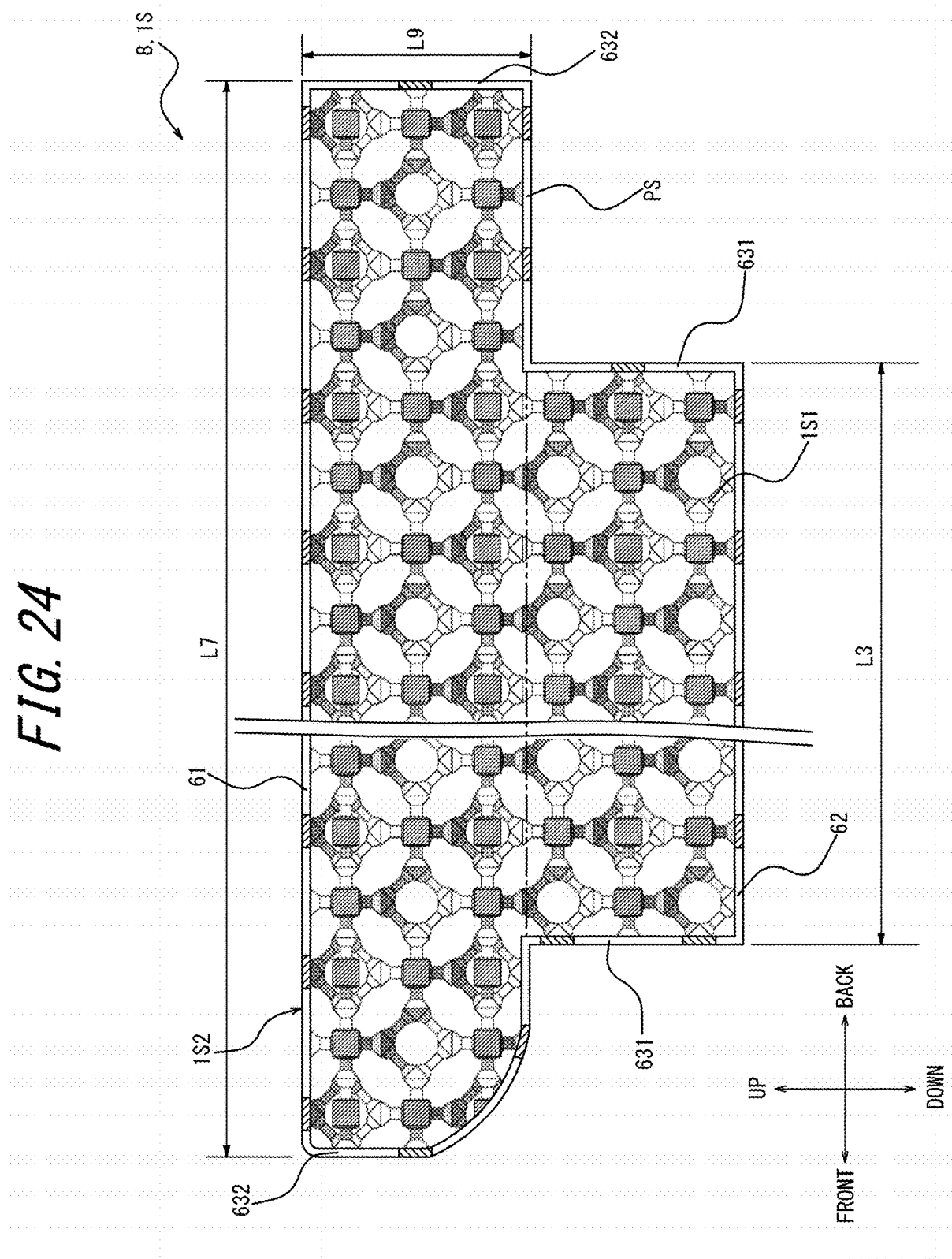

Subsequently, an example of a porous structural body 15 forming the filling body 8 included in the main pad 311 will be described in detail below with reference to FIGS. 22 to 24. FIG. 22 is a perspective view illustrating the filling body in the main pad in FIG. 17. FIG. 23 is a C-C cross-sectional view of the porous structural body in FIG. 22. FIG. 24 is a D-D cross-sectional view of the porous structural body in FIG. 22. In FIGS. 23 and 24, part of the porous structural body 15, which is indicated by dashed-dotted lines in the right-left direction is omitted.

The filling body 8 is formed of the porous structural body 15. The porous structural body 15 forming the filling body 8 (hereinafter also simply referred to as "the porous structural body 15") is a porous structural body having characteristics different from those of the porous structural body 1B for the seat body 7. Similarly to the porous structural body 1 described above, for example, the porous structural body 15 forming the filling body 8 includes a skeleton part 2 and a top skin part 6, and the top skin part 6 includes a smooth part 6A and a through hole 6B.

FIG. 22 is an external perspective view of the porous structural body 15. FIG. 23 is a C-C cross-sectional view of the porous structural body 15 in FIG. 22. FIG. 24 is a D-D cross-sectional view of the porous structural body 15 in FIG. 22.

The porous structural body 15 is shaped by a 3D printer. Similarly to the porous structural body 1 described above, the porous structural body 15 includes the skeleton part 2, and the top skin part 6 formed outermost in the skeleton part 2 and integrated with the skeleton part 2. The skeleton part 2 and the top skin part 6 are same as the skeleton part 2 and the top skin part 6 of the porous structural body 1, and the top skin part 6 includes a top-surface-side top skin part 61, a bottom-surface-side top skin part 62, and a side-surface-side top skin part 63. The shape of the porous structural body 1S is different from that in the example of the porous structural body 1 described above.

As illustrated in FIG. 22, the porous structural body 15 includes a first part 1S1, and a second part 1S2 integrated with the first part 1S1. The second part 1S2 protrudes beyond the first part 1S1 a direction orthogonal to a seating direction (the down direction illustrated in FIG. 1) when the seated person sits on the passenger-seat cushion member 300. Specifically, as illustrated in FIG. 23, the second part 1S2 protrudes beyond the first part 1S1 in the right-left direction. As illustrated in FIG. 24, the second part 1S2 protrudes beyond the first part 1S1 in the front-back direction.

In the porous structural body 15 thus configured, the side-surface-side top skin part 63 formed in the top skin part 6 in the outer side of the side surface side of the skeleton part 2 includes a first side-surface-side top skin part 631 formed in the first part 1S1 in the outer side of the side surface side of the skeleton part 2, and a second side-surface-side top skin part 632 formed in the second part 1S2 in the outer side of the side surface side of the skeleton part 2. Since the second part 1S2 protrudes beyond the first part 1S1, the second part 1S2 forms a pad stepping surface PS that faces in the down direction and is continuous with the first part 1S1. The porous structural body 15 is formed so that the pad stepping surface PS of the second part 1S2 is positioned along the body stepping surface BS of the seat body 7.

As illustrated in FIG. 22, a part protruding on the front side in the second part 1S2 has a curved lower end that is positioned lowest in the vicinity of the center in the right-left direction and positioned higher as the position moves toward end parts in the right-left direction. The part protruding on the front side in the second part 1S2 has a lower end part curved along the curved shape of the upper end of the front femoral circumferential periphery-placed part 723, which is described above with reference to FIG. 20. Accordingly, on the front side in the main pad 311, the porous structural body 1S is disposed wider in the vicinity of the center than at end parts. With this configuration, the porous structural body 15 having at least a cushioning characteristic is disposed at a part facing the seated person so that the seated person can comfortably sit.

The surface of the side-surface-side top skin part 63 at the part protruding on the front side in the second part 1S2 is curved. With this configuration, when the seated person sits on the passenger-seat cushion member 300 in which the porous structural body 1S is disposed, the curved surface on the front side in the second part 1S2 is positioned along the back of knees and the back lower leg region of the seated person, and thus a corner of the porous structural body 1S can be prevented from touching the seated person.

A length L1 of the first part 1S1 in the right-left direction illustrated in FIGS. 22 and 23 is substantially equal to a length L2 of a lower part of the hole part 74 defined by the right and left sides of the lower femoral circumferential periphery-placed part 722 in the right-left direction illustrated in FIG. 20. However, the length L1 may be slightly longer than the length L2 so that the first part 1S1 is fitted by pressing and made closely contact with the lower femoral circumferential periphery-placed part 722. A length L3 of the first part 1S1 in the front-back direction illustrated in FIGS. 22 and 24 is substantially equal to a length L4 of a lower part of the hole part 74 defined by the back side of the lower femoral circumferential periphery-placed part 722 and the front femoral circumferential periphery-placed part 723 in the front-back direction illustrated in FIG. 21. However, the length L3 may be slightly longer than the length L4 so that the first part 1S1 is fitted to the hole part 74 by pressing and made closely contact with the lower femoral circumferential periphery-placed part 722.

A length L5 of the second part 1S2 in the right-left direction illustrated in FIGS. 22 and 23 is substantially equal to a length L6 of an upper part of the hole part 74 defined by the right and left sides of the upper femoral circumferential periphery-placed part 721 in the right-left direction illustrated in FIG. 20. However, the length L5 may be slightly longer than the length L6 so that the second part 1S2 is fitted to the hole part 74 by pressing and made closely contact with the upper femoral circumferential periphery-placed part 721. A length L7 of the second part 1S2 in the front-back direction illustrated in FIGS. 22 and 24 may be substantially equal to or slightly longer than a length L8 between the back side of the upper femoral circumferential periphery-placed part 721 and the front femoral circumferential periphery-placed part 723 in the front-back direction illustrated in FIG. 21.

A length L9 of the second part 1S2 in the up-down direction illustrated in FIGS. 23 and 24 is substantially equal to a length L10 of the upper femoral circumferential periphery-placed part 721 in the up-down direction illustrated in FIG. 20.

With such a structure, when the hole part 74 is filled by the porous structural body 1S forming the passenger-seat cushion member 300, part of the second part 1S2 protruding beyond the first part 1S1 is locked by the body stepping surface BS. Accordingly, the porous structural body 1S is positioned in the up-down direction at the hole part 74 of the seat body 7. In this manner, the porous structural body 1S is stably disposed in the passenger-seat cushion member 300.

The porous structural body 1S fills the hole part 74 of the seat body 7. The porous structural body 15 is disposed at part of the passenger-seat cushion member 300, which faces the seated person. The ratio of the volume of the porous structural body 15 relative to the volume of the passenger-seat cushion member 300 may be 10 to 70%. With such a ratio, the robustness of the passenger-seat cushion member 300 can be maintained while the breathability thereof is maintained.

At filling of the hole part 74, the porous structural body 1S is inserted downward into the hole part 74 from above with the first part 1S1 being on the lower side. Accordingly, the part of the second part 1S2 protruding beyond the first part 1S1 is locked by the body stepping surface BS, and the porous structural body 1S is positioned in the up-down direction at the hole part 74 of the seat body 7. In this manner, the porous structural body 1S is stably disposed, and thus the passenger-seat cushion member 300 can be easily obtained.

The first side-surface-side top skin part 631 is fixed in contact with the inner side surface of the lower femoral circumferential periphery-placed part 722 through adhesive, and accordingly, the first part 1S1 is fixed to the lower femoral circumferential periphery-placed part 722. The second side-surface-side top skin part 632 is fixed in contact with the inner side surface of the upper femoral circumferential periphery-placed part 721 through adhesive, and accordingly, the second part 1S2 is fixed to the upper femoral circumferential periphery-placed part 721. The pad stepping surface PS is fixed in contact with the body stepping surface BS of the femoral circumferential periphery-placed part 72 through adhesive, and accordingly, the first part 1S1 is fixed to the pad stepping surface PS.

Accordingly, the filling body 8 formed of the porous structural body 15 can be bonded to the seat body 7 through each of the first side-surface-side top skin part 631, the second side-surface-side top skin part 632, and the pad stepping surface PS with high adhesiveness, and the passenger-seat cushion member 300 having high robustness can be manufactured.

Note that although the above description is made on the example in which the porous structural body 1S and the seat body 7 are formed so that the porous structural body 15 is inserted downward into the hole part 74 from above with the first part 151 being on the lower side, the present disclosure is not limited thereto. For example, the porous structural body 15 and the seat body 7 may be formed so that the porous structural body 15 is inserted upward into the seat body 7 from below.

Figure 25:
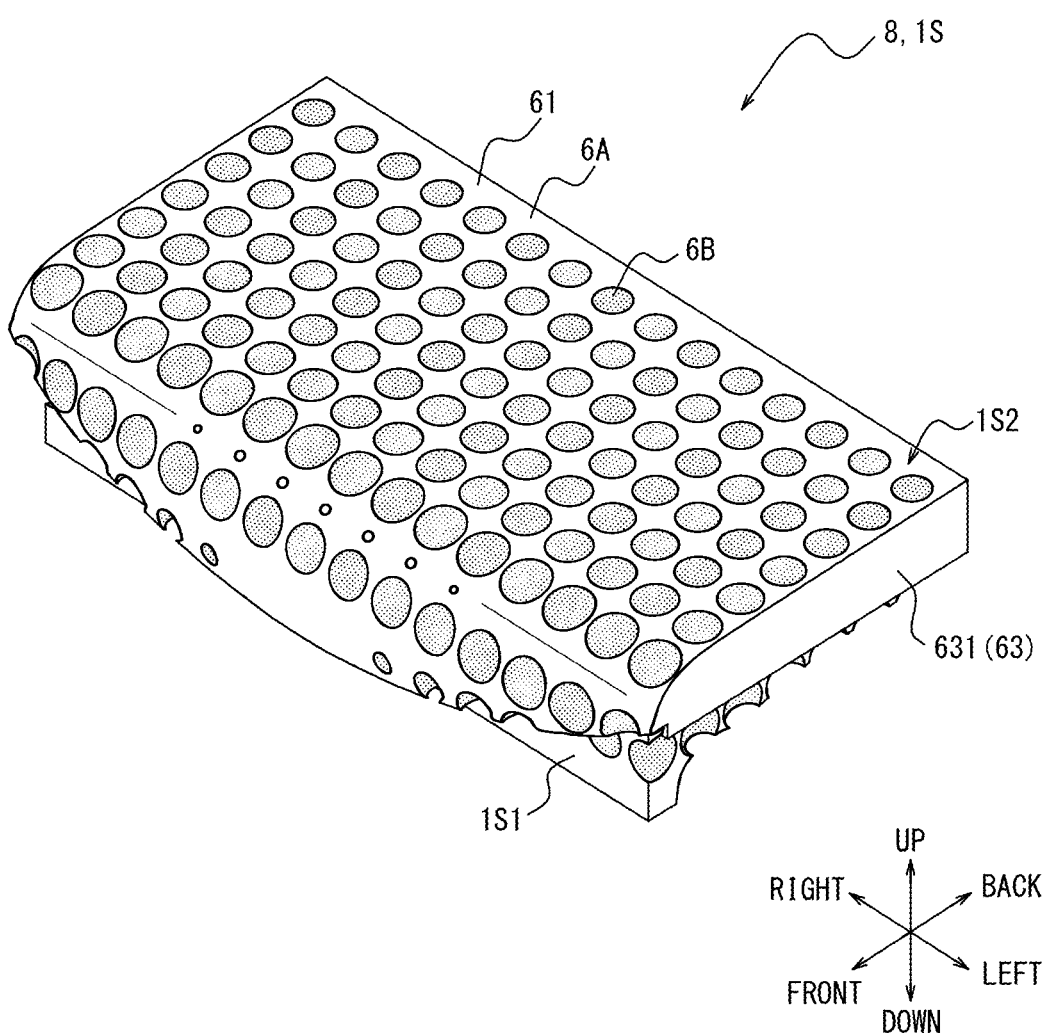
FIG. 25 is a perspective view illustrating a modification of a top skin part of the porous structural body in the main pad in FIG. 22.

Note that the second side-surface-side top skin part 632 of the porous structural body 15 may have no through holes 6B as illustrated in FIG. 25. Accordingly, the second side-surface-side top skin part 632 is solidly fixed to the inner side wall surface of the hole part 74 of the seat body 7 by adhesive in a region larger than that in a case in which the second side-surface-side top skin part 632 includes a through hole 6B, and thus the robust passenger-seat cushion member 300 is formed. Similarly, although not illustrated, the first side-surface-side top skin part 631 of the porous structural body 15 may have through holes 6B. Similarly, in this case, the second side-surface-side top skin part 632 can be solidly fixed to the inner side wall surface of the hole part 74 of the seat body 7 by adhesive in a larger region. As described above, in a case of a concave shape having a bottom surface on the upper or lower side, the bottom-surface-side top skin part 62 or the top-surface-side top skin part 61, the bottom surface where the filling body 8 contacts when filling the hole part 74 may have no through holes 6B.

Figure 26:
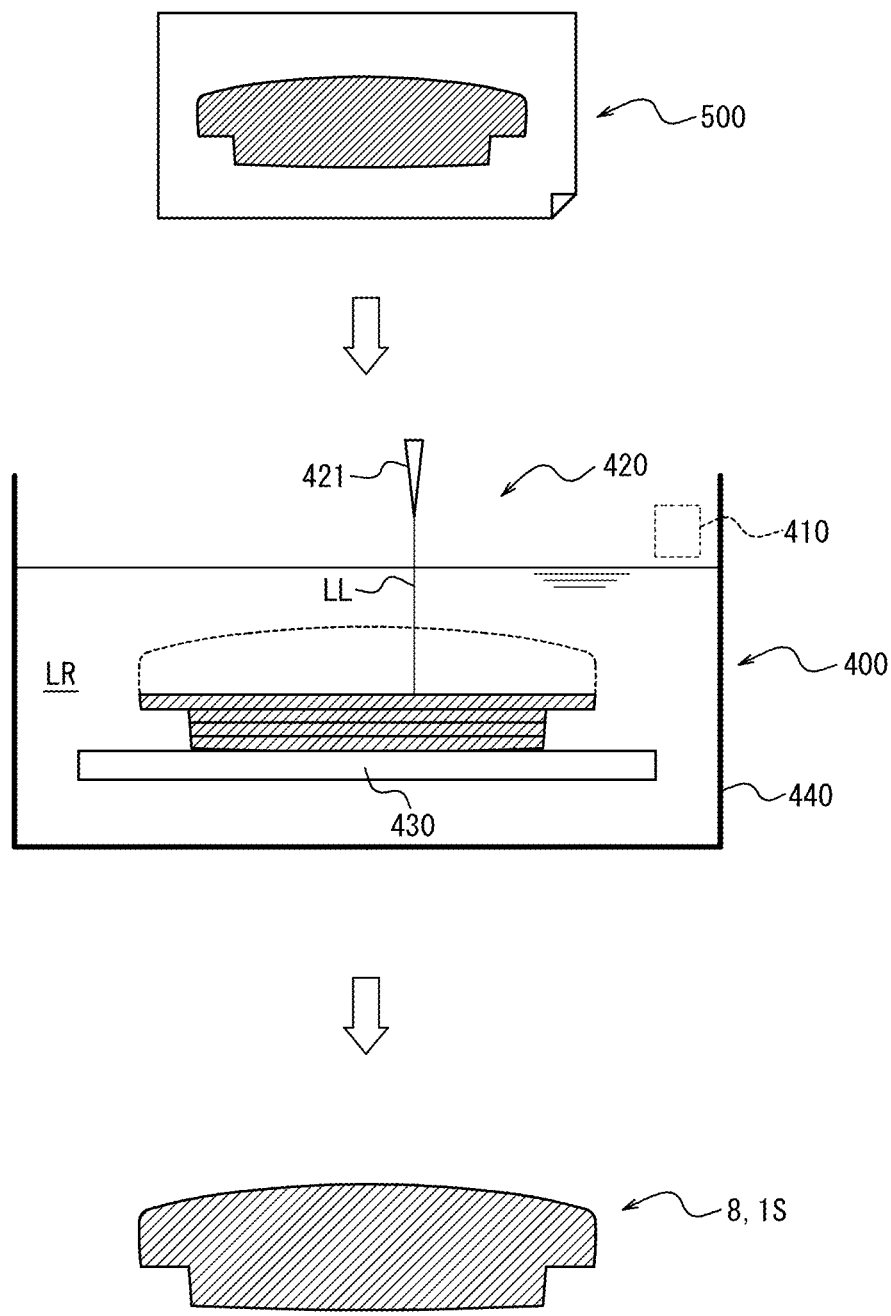
FIG. 26 is a drawing for description of a method of manufacturing the porous structural body of the passenger-seat cushion member according to an embodiment of the present disclosure.

Subsequently, a method of manufacturing the porous structural body 15 according to an embodiment of the present disclosure will be described below with reference to FIG. 26. FIG. 26 illustrates, as an example, the porous structural body 1S according to an embodiment of the present disclosure illustrated in FIGS. 22 to 24 being manufactured by a 3D printer.

First, three-dimensional shape data (for example, three-dimensional CAD data) representing the three-dimensional shape of the porous structural body 15 forming the filling body 8 is produced by using a computer in advance.

Subsequently, the above-described three-dimensional shape data is converted into 3D shaping data 500 by using a computer. The 3D shaping data 500 is read by a controller 410 of the 3D printer 400 when a shaping unit 420 of a 3D printer 400 performs shaping, and the controller 410 causes the shaping unit 420 to shape the porous structural body 1S forming the filling body 8. The 3D shaping data 500 includes, for example, slice data representing the two-dimensional shape of each layer of the porous structural body 15 forming the filling body 8.

Subsequently, shaping of the porous structural body 15 forming the filling body 8 is performed by the 3D printer 400. The 3D printer 400 may perform the shaping by using an optional shaping scheme such as an optical shaping scheme, a powder sintering lamination scheme, a heat melting lamination scheme (FDM scheme), or an ink jet scheme. FIG. 26 illustrates the shaping being performed by the optical shaping scheme.

The 3D printer 400 includes the controller 410 made of a CPU or the like, the shaping unit 420 configured to perform shaping in accordance with control by the controller 410, a supporting table 430 on which a shaping object (which is the filling body 8) to be shaped is placed, and a housing body 440 in which liquid resin LR, the supporting table 430, and the shaping object are housed. The shaping unit 420 includes a laser emitter 421 configured to emit an ultraviolet laser beam LL when the optical shaping scheme is used as in the present example. The housing body 440 is filled with the liquid resin LR. The liquid resin LR is cured into flexible resin through irradiation of the ultraviolet laser beam LL emitted from the laser emitter 421.

In the 3D printer 400 thus configured, first, the controller 410 reads the 3D shaping data 500 sequentially shapes each layer based on a three-dimensional shape included in the read 3D shaping data 500 while controlling the shaping unit 420 to emit the ultraviolet laser beam LL.

After the shaping by the 3D printer 400 is completed, the shaping object is taken out of the housing body 440. Accordingly, the porous structural body 1S as the filling body 8 is finally obtained as the shaping object.

Note that when the porous structural body 1S is made of resin, the porous structural body 1S as the shaping object may be heated in an oven after the shaping by the 3D printer 400 is completed. In this case, connection between layers included in the porous structural body 15 can be reinforced to reduce anisotropy of the porous structural body 1S, and thus the cushion-member characteristic of the porous structural body 1S can be further improved.

When the porous structural body 15 is made of rubber, the porous structural body 15 as the shaping object may be vulcanized after the shaping by the 3D printer 400 is completed.

When the filling body 8 is shaped by using a 3D printer in this manner, the hole part 74 is filled by the porous structural body 15. Before the filling with the porous structural body 1S, an adhesive is applied to the inner side sidewall of the femoral circumferential periphery-placed part 72 or the side-surface-side top skin part 63. Then, the porous structural body 1 is inserted downward into the hole part 74 from above with the first part 1S1 being on the lower side. Accordingly, the part of the second part 1S2 protruding beyond the first part 1S1 is locked by the body stepping surface BS, and the porous structural body 1 forming the passenger-seat cushion member 300 is positioned in the up-down direction at the hole part 74 of the seat body 7.

The first part 1S1 is fixed to the lower femoral circumferential periphery-placed part 722 as the adhesive is cured while the first side-surface-side top skin part 631 is in contact with the inner side surface of the lower femoral circumferential periphery-placed part 722 through the adhesive. The second part 1S2 is fixed to the upper femoral circumferential periphery-placed part 721 as the adhesive is cured while the second side-surface-side top skin part 632 is in contact with the inner side surface of the upper femoral circumferential periphery-placed part 721 through the adhesive. The first part 1S1 is fixed to the pad stepping surface PS as the adhesive is cured while the pad stepping surface PS is in contact with the body stepping surface BS of the femoral circumferential periphery-placed part 72 through the adhesive. In this manner, the main pad 311 in which the seat body 7 is filled by the filling body 8 formed of the porous structural body 1S as illustrated in FIG. 17 is formed.

When the filling body 8 is shaped by using a 3D printer, the configuration of the porous structural body 1S as the filling body 8 can be easily changed only by changing the 3D shaping data. Accordingly, characteristics of the filling body 8 can be easily adjusted. For example, only by changing the 3D shaping data, it is possible to easily change the dimension of each component included in the skeleton part 2 and the shape and size of each cell hole and change the size, shape, number, and position of each through hole 6B in the top skin part 6. Thus, it is possible to shape the porous structural body 15 having characteristics changed by easily changing its structure in the above-described manner, thereby easily adjusting characteristics of the filling body 8 and achieving the filling body 8 as desired in a simple manner.

Moreover, by using the filling body 8 thus configured, it is possible to easily obtain the passenger-seat cushion member 300 corresponding to various requested characteristics.

[First and Second Modifications of Passenger-Seat Cushion Member]

In each example described in the present specification, the porous structural body 1 may serve as only one of the cushion pad 310, the back pad 320, and the head rest 340 of the passenger-seat cushion member 300.

Figure 27:
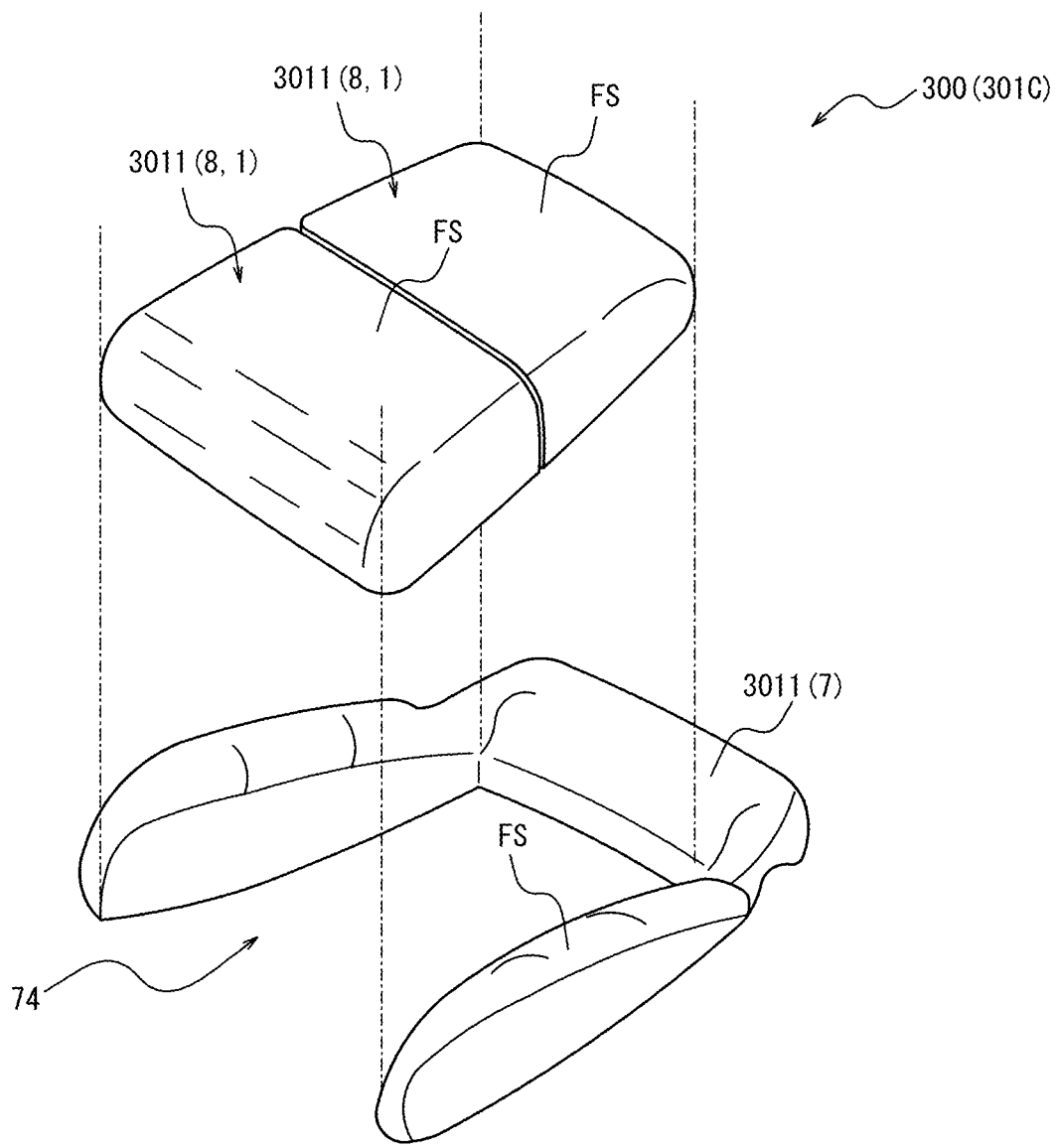
FIG. 27 is a drawing for description of a first modification of the passenger-seat cushion member that can include the porous structural body according to an optional embodiment of the present disclosure.

As in a modification illustrated in FIG. 27, the porous structural body 1 may serve as only part of the cushion pad 310, only part of the back pad 320, and/or only part of the head rest 340 of the passenger-seat cushion member 300. Accordingly, the size of the porous structural body 1 can be reduced so that the porous structural body 1 can be manufactured by a relatively small-sized 3D printer. In this case, a part other than a part formed by the porous structural body 1 among the cushion pad 310, the back pad 320, and the head rest 340 of the passenger-seat cushion member 300 may be manufactured into a conventional typical configuration as described above through the process of foaming by chemical reaction in, for example, mold shaping or slab shape. For example, as in the example of FIG. 27, the cushion pad 310, the back pad 320, and/or the head rest 340 of the passenger-seat cushion member 300 may each include a plurality of cushion parts 3011 separated from each other, only some (one or a plurality) of the plurality of cushion parts 3011 may be formed of the porous structural body 1, and the other cushion parts 3011 may have a conventional typical configuration as described above. More specifically, for example, as in the example of FIG. 27, the cushion pad 310, the back pad 320, and/or the head rest 340 of the passenger-seat cushion member 300 may each include one or a plurality (in the example of FIG. 27, two) of filling bodies 8 formed of the porous structural body 1, and a seat body 7 separated from the one or plurality of filling bodies 8, including a hole part 74 filling by the one or plurality of filling bodies 8, and having a conventional typical configuration as described above. The material of the seat body 7 is not particularly limited but may be, for example, existing seat urethane foam. The density of the existing seat urethane foam is, for example, 30 to 80 kg/m$^3$. The cell diameter of the existing seat urethane foam is, for example, 0.1 to 1.0 mm. The breathability of the existing seat urethane foam is, for example, 5 to 150 cc/cm$^3$/sec.

Alternatively, the cushion pad 310, the back pad 320, and/or the head rest 340 of the passenger-seat cushion member 300 may be constituted by the plurality of cushion parts 3011 separated from each other, and the plurality of cushion parts 3011 may be each formed of the porous structural body 1. Accordingly, the size of the porous structural body 1 can be reduced so that the porous structural body 1 can be manufactured by a relatively small-sized 3D printer.

In each example described in the present specification, when the cushion pad 310, the back pad 320, and/or the head rest 340 of the passenger-seat cushion member 300 each include the plurality of cushion parts 3011 separated from each other and some (one or a plurality) of the plurality of cushion parts 3011 or all cushion parts 3011 are formed of the porous structural body 1 as described above (and as in example of FIG. 27), a pair of cushion parts 3011 adjacent to each other may be bonded to each other by adhesive 3012 as in the example of FIG. 28. In this case, the adhesive 3012 is preferably disposed not to be exposed on the surface FS of each cushion part 3011 on the seated person side, in other words, is preferably separated on the back surface BSS side from the surface FS of each cushion part 3011 on the seated person side. Accordingly, the seated person can be prevented from contacting the hardened adhesive 3012 when applying weight to the cushion part 3011, and thus discomfort felt by the seated person through contact the hardened adhesive 3012 can be prevented.

In this case, above-described, a distance L20 (FIG. 28) between a pair of facing surfaces 3011a facing each other (which is the thickness of the adhesive 3012) among surfaces of the pair of cushion parts 3011 adjacent to each other is preferably 2 to 10 mm.

In this case, a distance L21 (FIG. 28) from the surface FS on the seated person side of each of the above-described pair of cushion parts 3011 adjacent to each other to the adhesive 3012 is preferably 2 to 20 mm. The distance L21 (FIG. 28) from the surface FS on the seated person side to the adhesive 3012 is measured perpendicularly to the surface FS on the seated person side.

In this case, it is preferable that one of the above-described pair of cushion parts 3011 adjacent to each other is formed of the porous structural body 1 and the other of the above-described pair of cushion parts 3011 adjacent to each other is formed of the porous structural body 1 or has a conventional typical configuration as described above.

Alternatively, in each example described in the present specification, when the cushion pad 310, the back pad 320, and/or the head rest 340 of the passenger-seat cushion member 300 each include a plurality of cushion parts 3011 separated from each other and some (one or a plurality) of the plurality of cushion parts 3011 or all cushion parts 3011 are formed of the porous structural body 1 as described above (and as in the example of FIG. 27), the pair of cushion parts 3011 adjacent to each other may not be bonded to each other by the adhesive 3012 as in the example of FIG. 29. Accordingly, it is possible to prevent discomfort felt by the seated person through contact with the hardened adhesive 3012 when applying weight to the cushion parts 3011.

In this case, the above-described pair of cushion parts 3011 adjacent to each other are preferably separated from each other. More specifically, a distance L23 (FIG. 29) between the pair of facing surfaces 3011a facing each other among the surfaces of the above-described pair of cushion parts 3011 adjacent to each other is preferably 5 to 20 mm. Accordingly, it is possible to prevent discomfort felt by the seated person when applying weight to the cushion part 3011.

In this case, a corner 3011b between the surface FS on the seated person side and the facing surface 3011a on the surface of each of the above-described pair of cushion parts 3011 adjacent to each other preferably has a chamfered curve shape (in other words, is rounded) at a section of each cushion part 3011 in the thickness direction. Accordingly, it is possible to prevent discomfort felt by the seated person when applying weight to the cushion part 3011.

In this case, it is preferable that one of the above-described pair of cushion parts 3011 adjacent to each other is formed of the porous structural body 1 and the other of the above-described pair of cushion parts 3011 adjacent to each other is formed of the porous structural body 1 or has a conventional typical configuration as described above.

In each example described in the present specification, the top skin part 6 of the porous structural body 1 is preferably semi-transparent or transparent, more preferably semi-transparent. With this configuration, the skeleton part 2 of the porous structural body 1 can be visually recognized from the outside of the porous structural body 1 through the top skin part 6. Accordingly, the appearance of the porous structural body 1 can be improved so that, for example, a person visually recognizes the porous structural body 1 can easily understand that the porous structural body 1 is shaped by a 3D printer.

In this case, the skeleton part 2 of the porous structural body 1 is preferably opaque to improve the appearance of the porous structural body 1, but may be semi-transparent or transparent. For the easiness of manufacturing the porous structural body 1, the entire porous structural body 1 is preferably made of the same material, and moreover, the entire porous structural body 1 (the top skin part 6 and the skeleton part 2) is preferably semi-transparent or transparent, more preferably semi-transparent.

In this case, the thickness of the top skin part 6 is preferably 0.5 to 2.0 mm. With this configuration, the skeleton part 2 can be visually recognized from the outside through the top skin part 6 as described above and it is easily understandable that the porous structural body 1 is shaped by a 3D printer, and in addition, the porous structural body 1 can more effectively withstand practical use stress such as weight and scratch, which leads to durability improvement.

However, the top skin part 6 of the porous structural body 1 may be opaque.

Note that the configurations of the top skin part 6 of a plurality of optional different examples described above may be combined with each other. The configurations of the skeleton part 2 of a plurality of optional different examples described above may be combined with each other. Although the embodiments of the present disclosure are specifically described above, the present disclosure is not limited to the above-described embodiments.

INDUSTRIAL APPLICABILITY

A filling-body manufacturing method, a passenger-seat-cushion-member manufacturing method, and a filling body of the present disclosure are preferably used for a passenger seat, more preferably used for a car passenger seat.

REFERENCE SIGNS LIST 1 porous structural body
110 top surface
120 bottom surface
130 side surface
1B porous structural body forming seat body
1S porous structural body forming filling body
1S1 first part
1S2 second part
2 skeleton part
2B bone part
2Be end part of bone part
2B1 bone constant part
2B2 bone change part
2B21 edge of bone change part on connection part side
2B22 edge of bone change part on bone constant part side
2B23 tilted surface of bone change part
2J connection part
3 film
11 first part of porous structural body 12 second part of porous structural body
13 third part of porous structural body
21 first cell defining part
22 second cell defining part
211 first annular part
211L first large annular part
211S first small annular part
2111 inner periphery side edge part of first annular part
222 second annular part
2221 inner periphery side edge part of second annular part
300 passenger-seat cushion member
301B seat-back cushion member
301C seat-cushion cushion member
3011 cushion part
3011a facing surface
3011b corner
3012 adhesive
310 cushion pad
311 main pad
312 side pad
320 back pad
321 main pad
322 side pad
340 head rest
400 3D printer
410 controller
420 shaping unit
421 laser emitter
430 supporting table
440 housing body
LL ultraviolet laser beam
LR liquid resin
500 3D shaping data
6 top skin part
61 top-surface-side top skin part
62 bottom-surface-side top skin part
63 side-surface-side top skin part
6A smooth part
6B through hole
7 seat body
71 under-hip portion
72 femoral circumferential periphery-placed part
73 groove part
74 hole part
721 upper femoral circumferential periphery-placed part
721 lower femoral circumferential periphery-placed part
8 filling body
C cell hole
C1 first cell hole
C2 second cell hole
O skeleton line
U unit part of porous structural body
V1 first virtual surface
V1L first large virtual surface
V1S first small virtual surface
V2 second virtual surface
BS body stepping surface
PS pad stepping surface
FS surface on seated person side
BSS back surface

The invention claimed is:

1. A filling-body manufacturing method of manufacturing a filling body that fills a hole part formed at a seat body in a passenger-seat cushion member including the seat body and the filling body,
the filling body being a porous structural body made of flexible resin or rubber,
the filling-body manufacturing method comprising a shaping step of shaping the filling body by using a 3D printer, wherein
the porous structural body includes a skeleton part,
the skeleton part includes
a plurality of bone parts, and
a plurality of connection parts connecting end parts of the plurality of bone parts,
the skeleton part includes a first cell defining part that defines a first cell hole inside,
the first cell defining part includes a plurality of first annular parts having annular shapes,
the plurality of first annular parts are coupled with each other so that first virtual surfaces defined by inner periphery side edge parts of the respective first annular parts do not intersect with each other,
the first cell hole is defined by the plurality of first annular parts and the plurality of first virtual surfaces defined by the plurality of respective first annular parts,
each first annular part is constituted by a plurality of the bone parts and a plurality of the connection parts,
each bone part is constituted by a bone constant part extending while keeping cross-sectional area constant, and a pair of bone change parts extending from the bone constant part to the corresponding connection parts while gradually changing cross-sectional area at both sides of the bone constant part in the extension direction, and
a ratio A0/A1 of cross-sectional area A0 of the bone constant part relative to cross-sectional area A1 of an edge of the bone part on at least one side satisfies:

$$0.15 \leq A0/A1 < 1.0 \text{ or } 1.0 < A0/A1 \leq 2.0.$$

2. The filling-body manufacturing method according to claim 1, wherein the porous structural body includes
a top skin part that is formed on at least part of an outer side of the skeleton part and integrated with the skeleton part, at least part of an outer side of the top skin part being a surface.

3. The filling-body manufacturing method according to claim 1, wherein a ratio of the volume of the filling body relative to the volume of the passenger-seat cushion member is 10 to 70%.

4. The filling-body manufacturing method according to claim 2, wherein at least part of the surface of the top skin part is a curved surface.

5. The filling-body manufacturing method according to claim 4, wherein
the filling body includes a first part and a second part integrated with the first part, and
the second part protrudes beyond the first part in a direction intersecting with a seating direction when a seated person sits on the passenger-seat cushion member.

6. The filling-body manufacturing method according to claim 4, wherein the filling body is disposed at part of the passenger-seat cushion member, the part facing a seated person.

7. The filling-body manufacturing method according to claim 4, wherein a ratio of the volume of the filling body relative to the volume of the passenger-seat cushion member is 10 to 70%.

8. The filling-body manufacturing method according to claim 2, wherein
the filling body includes a first part and a second part integrated with the first part, and the second part protrudes beyond the first part in a direction intersecting with a seating direction when a seated person sits on the passenger-seat cushion member.

9. The filling-body manufacturing method according to claim 8, wherein the filling body is disposed at part of the passenger-seat cushion member, the part facing a seated person.

10. The filling-body manufacturing method according to claim 8, wherein a ratio of the volume of the filling body relative to the volume of the passenger-seat cushion member is 10 to 70%.

11. The filling-body manufacturing method according to claim 2, wherein the filling body is disposed at part of the passenger-seat cushion member, the part facing a seated person.

12. The filling-body manufacturing method according to claim 2, wherein a ratio of the volume of the filling body relative to the volume of the passenger-seat cushion member is 10 to 70%.

13. The filling-body manufacturing method according to claim 1, wherein the filling body is disposed at part of the passenger-seat cushion member, the part facing a seated person.

14. The filling-body manufacturing method according to claim 13, wherein a ratio of the volume of the filling body relative to the volume of the passenger-seat cushion member is 10 to 70%.

15. A passenger-seat-cushion-member manufacturing method of manufacturing a passenger-seat cushion member including a seat body and a filling body that fills a hole part formed at the seat body,
the filling body being a porous structural body made of flexible resin or rubber,
the passenger-seat-cushion-member manufacturing method comprising:
a shaping step of shaping the filling body by using a 3D printer; and
a filling step of filling the hole part formed at the seat body with the filling body obtained in the shaping step, wherein
the porous structural body includes a skeleton part,
the skeleton part includes
a plurality of bone parts, and
a plurality of connection parts connecting end parts of the plurality of bone parts,
the skeleton part includes a first cell defining part that defines a first cell hole inside,
the first cell defining part includes a plurality of first annular parts having annular shapes,
the plurality of first annular parts are coupled with each other so that first virtual surfaces defined by inner periphery side edge parts of the respective first annular parts do not intersect with each other,
the first cell hole is defined by the plurality of first annular parts and the plurality of first virtual surfaces defined by the plurality of respective first annular parts,
each first annular part is constituted by a plurality of the bone parts and a plurality of the connection parts,
each bone part is constituted by a bone constant part extending while keeping cross-sectional area constant, and a pair of bone change parts extending from the bone constant part to the corresponding connection parts while gradually changing cross-sectional area at both sides of the bone constant part in the extension direction, and
a ratio $A0/A1$ of cross-sectional area $A0$ of the bone constant part relative to cross-sectional area $A1$ of an edge of the bone part on at least one side satisfies:

$0.15 \leq A0/A1 < 1.0$ or $1.0 < A0/A1 \leq 2.0$.

16. A filling body that fills a hole part formed at a seat body and at least part of which is bonded to the seat body in a passenger-seat cushion member including the seat body and the filling body,
the filling body being a porous structural body made of flexible resin or rubber,
the filling body being shaped by using a 3D printer, wherein
the porous structural body includes a skeleton part,
the skeleton part includes
a plurality of bone parts, and
a plurality of connection parts connecting end parts of the plurality of bone parts,
the skeleton part includes a first cell defining part that defines a first cell hole inside,
the first cell defining part includes a plurality of first annular parts having annular shapes,
the plurality of first annular parts are coupled with each other so that first virtual surfaces defined by inner periphery side edge parts of the respective first annular parts do not intersect with each other,
the first cell hole is defined by the plurality of first annular parts and the plurality of first virtual surfaces defined by the plurality of respective first annular parts,
each first annular part is constituted by a plurality of the bone parts and a plurality of the connection parts,
each bone part is constituted by a bone constant part extending while keeping cross-sectional area constant, and a pair of bone change parts extending from the bone constant part to the corresponding connection parts while gradually changing cross-sectional area at both sides of the bone constant part in the extension direction, and
a ratio $A0/A1$ of cross-sectional area $A0$ of the bone constant part relative to cross-sectional area $A1$ of an edge of the bone part on at least one side satisfies:

$0.15 \leq A0/A1 < 1.0$ or $1.0 < A0/A1 \leq 2.0$.

\* \* \* \* \*